(12) United States Patent
Mani

(10) Patent No.: US 11,856,269 B2
(45) Date of Patent: Dec. 26, 2023

(54) REQUESTING EMERGENCY SERVICES USING A SET-TOP BOX

(71) Applicant: Sivaram Kumar Mani, Parker, CO (US)

(72) Inventor: Sivaram Kumar Mani, Parker, CO (US)

(73) Assignee: Charter Communications, LLC, St. Louis, MO (US)

( * ) Notice: Subject to any disclaimer, the term of this patent is extended or adjusted under 35 U.S.C. 154(b) by 63 days.

(21) Appl. No.: 17/378,320

(22) Filed: Jul. 16, 2021

(65) Prior Publication Data

US 2023/0018815 A1    Jan. 19, 2023

(51) Int. Cl.
  *G08B 13/14*    (2006.01)
  *H04N 21/488*   (2011.01)
  *G08B 25/01*    (2006.01)
  *G08B 21/02*    (2006.01)

(52) U.S. Cl.
  CPC ........... *H04N 21/488* (2013.01); *G08B 21/02* (2013.01); *G08B 25/016* (2013.01)

(58) Field of Classification Search
  CPC ..... H04N 21/488; G08B 21/02; G08B 25/016
  USPC .................................................. 340/573.1
  See application file for complete search history.

(56) References Cited

U.S. PATENT DOCUMENTS

| | | |
|---|---|---|
| 2002/0147982 A1 | 10/2002 | Naidoo |
| 2005/0229103 A1 | 10/2005 | King |
| 2006/0176167 A1 | 8/2006 | Dohrmann |
| 2015/0140954 A1* | 5/2015 | Maier ............... H04W 4/025 455/404.2 |
| 2015/0161452 A1 | 6/2015 | McCarthy, III |
| 2015/0163411 A1 | 6/2015 | McCarthy, III |
| 2015/0163651 A1* | 6/2015 | Tuck ................ H04M 3/42357 370/259 |
| 2015/0221201 A1* | 8/2015 | Ogle ............... H04N 21/23605 725/80 |

(Continued)

OTHER PUBLICATIONS

Lin, Bor-Shing, PhD, et al., "Design and Implementation of a Set-Top Box-Based Homecare System Using Hybrid Cloud," Telemed J E Health. 2015; 21(11):916-922. doi:10.1089/tmj.2014.0244. https://www.ncbi.nlm.nih.gov/pmc/articles/PMC4649762/.

(Continued)

*Primary Examiner* — Tai T Nguyen
(74) *Attorney, Agent, or Firm* — The Law Office of Brandon N. Sklar; Brandon N. Sklar

(57) ABSTRACT

Methods, systems, and a remote control for sending emergency alert requests are disclosed. The methods and systems comprise receiving an emergency alert request from a user via a set-top box at a subscriber location. The emergency alert request is received from a remote control. A medical alert message is sent by the set-top box to a processing device, based on the received medical alert request, via a first network. The processing device sends an emergency alert instruction to provide emergency assistance to the subscriber location to an emergency assistance service provider, via a second network, based, at least in part, on the message. A request to provide medical assistance to the subscriber location may be sent to a medical assistance service provider, who may be a third party. Emergency alert requests for the police or fire department may be sent to a 9-1-1 service.

23 Claims, 20 Drawing Sheets

(56) References Cited

U.S. PATENT DOCUMENTS

2017/0103175 A1* 4/2017 Chopra .................. G16H 40/63
2018/0310892 A1 11/2018 Perschbacher
2020/0213852 A1* 7/2020 Obaidi ................ H04L 63/1416
2022/0046402 A1* 2/2022 Feng ....................... H04W 4/90

OTHER PUBLICATIONS

Depp CA, et al., "Age, affective experience, and television use." Am J Prev Med. 2010;39(2):173-178. doi:10.1016/j.amepre.2010.03.020. https://www.ncbi.nlm.nih.gov/pmc/articles/PMC3593658/.

"The State of Traditional TV: Updated With Q3 2020 Data," Marketing Charts, May 12, 2021. https://www.marketingcharts.com/featured-105414.

Richter, Felix, "The Generation Gap in TV Consumption," Statista Content & Information Design, Nov. 20, 2020., https://www.statista.com/chart/15224/daily-tv-consumption-by-us-adults/.

Livingston, Gretchen, "Americans 60 and older are spending more time in front of their screens than a decade ago," Jun. 18, 2019. https://www.pewresearch.org/fact-tank/2019/06/18/americans-60-and-older-are-spending-more-time-in-front-of-their-screens-than-a-decade-ago/.

Norman, Christopher, "The Best Medical Alert Systems of 2020," Caring.com, Apr. 24, 2020. http://webarchive.org/web/20200613173744/https://www.caring.com/best-medical-alert-systems/.

"STB for Senior Living," Geniatech, Inc., 2019, http://www.geniatech.com/solution/healthcare/.

* cited by examiner

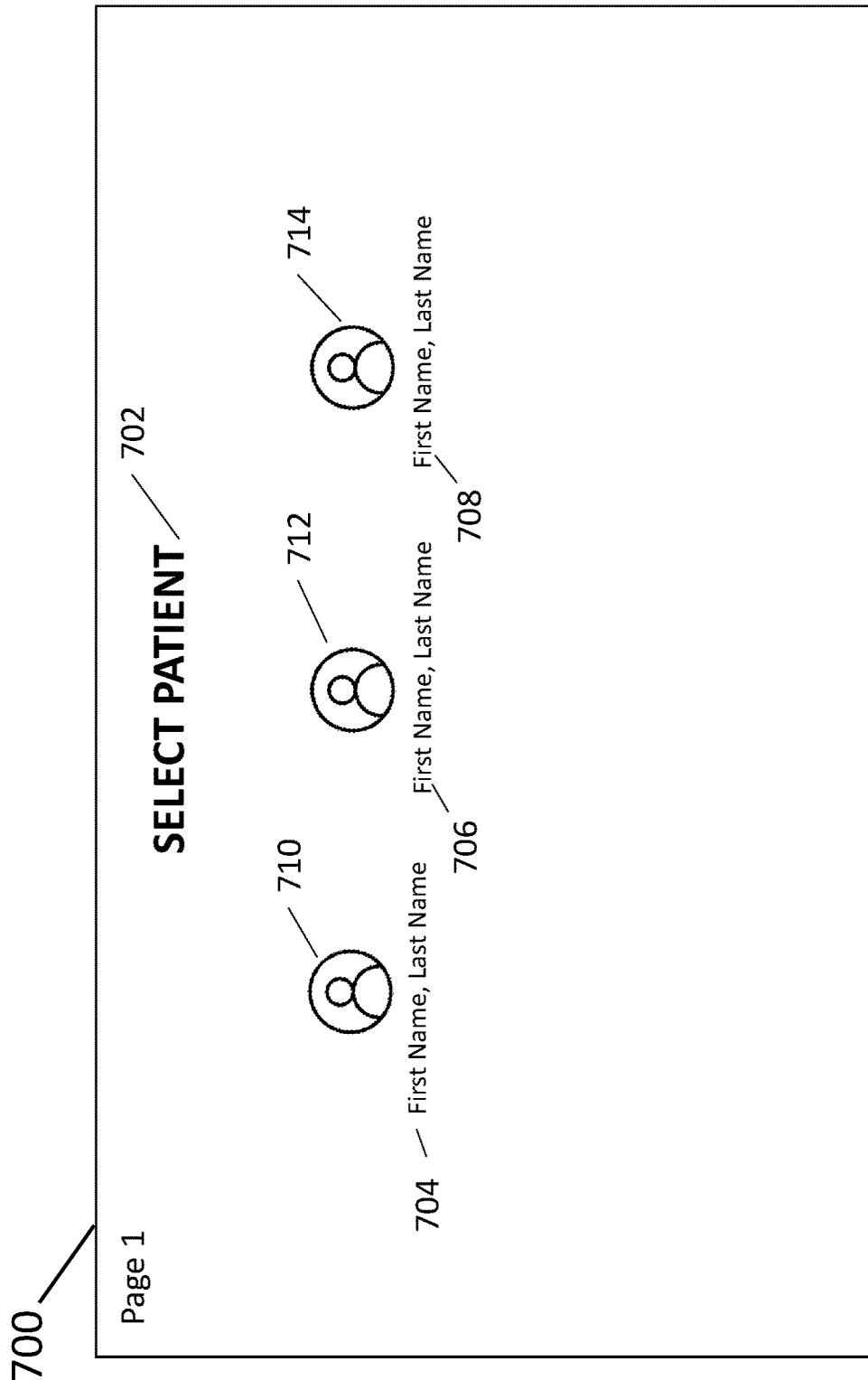

800 page 2

GET MEDICAL ASSISTANCE

Facility Name : Best Health Facility

Address :  10 Healthy Ave,
            Denver, CO

Phone :  XXX-YYY-ZZZZ

Patient Name :  John Doe

Address :  Room 222

You have opened the Medical Assistance Page.
Press OK to get immediate assistance.

GET HELP

840

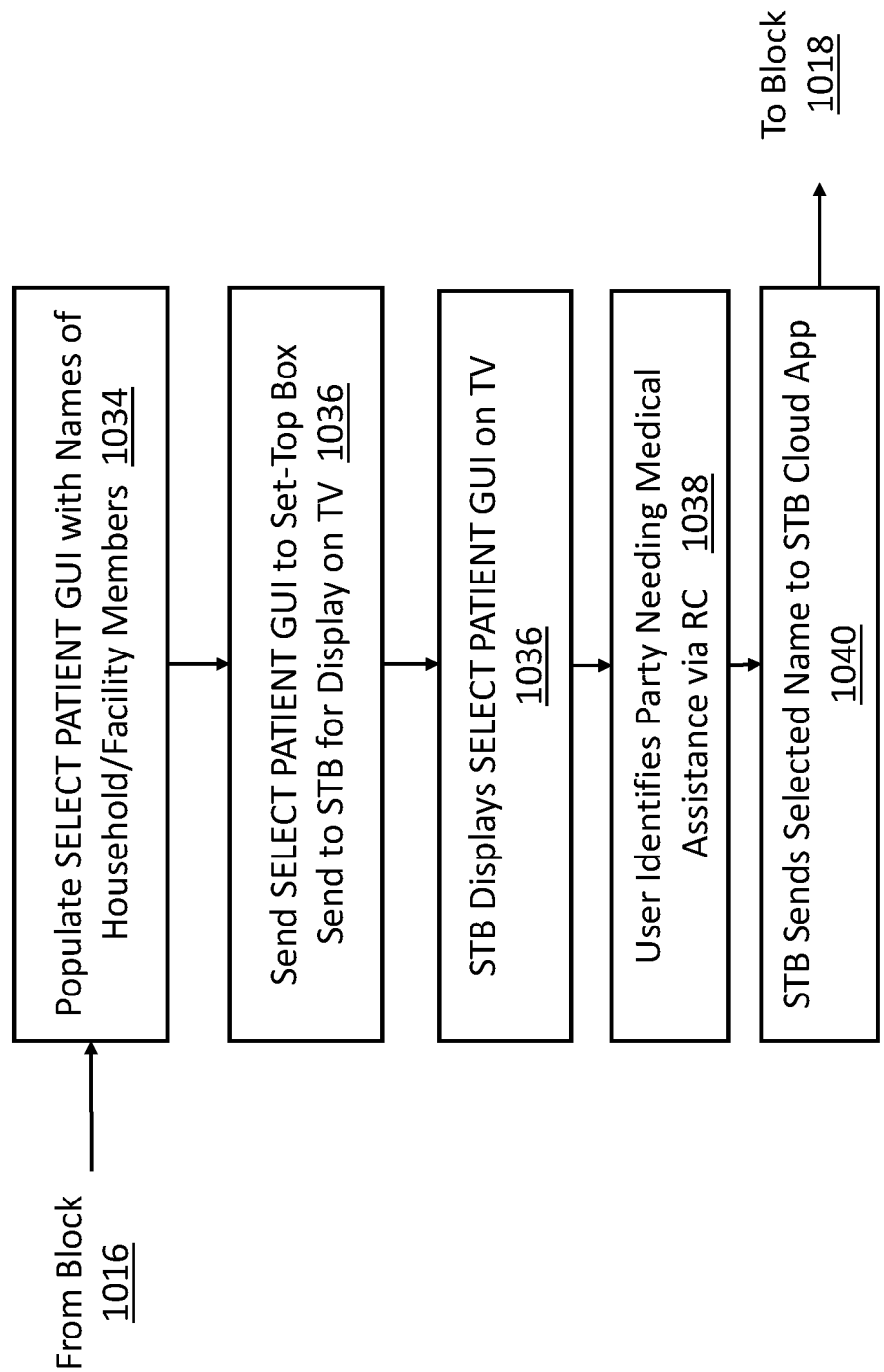

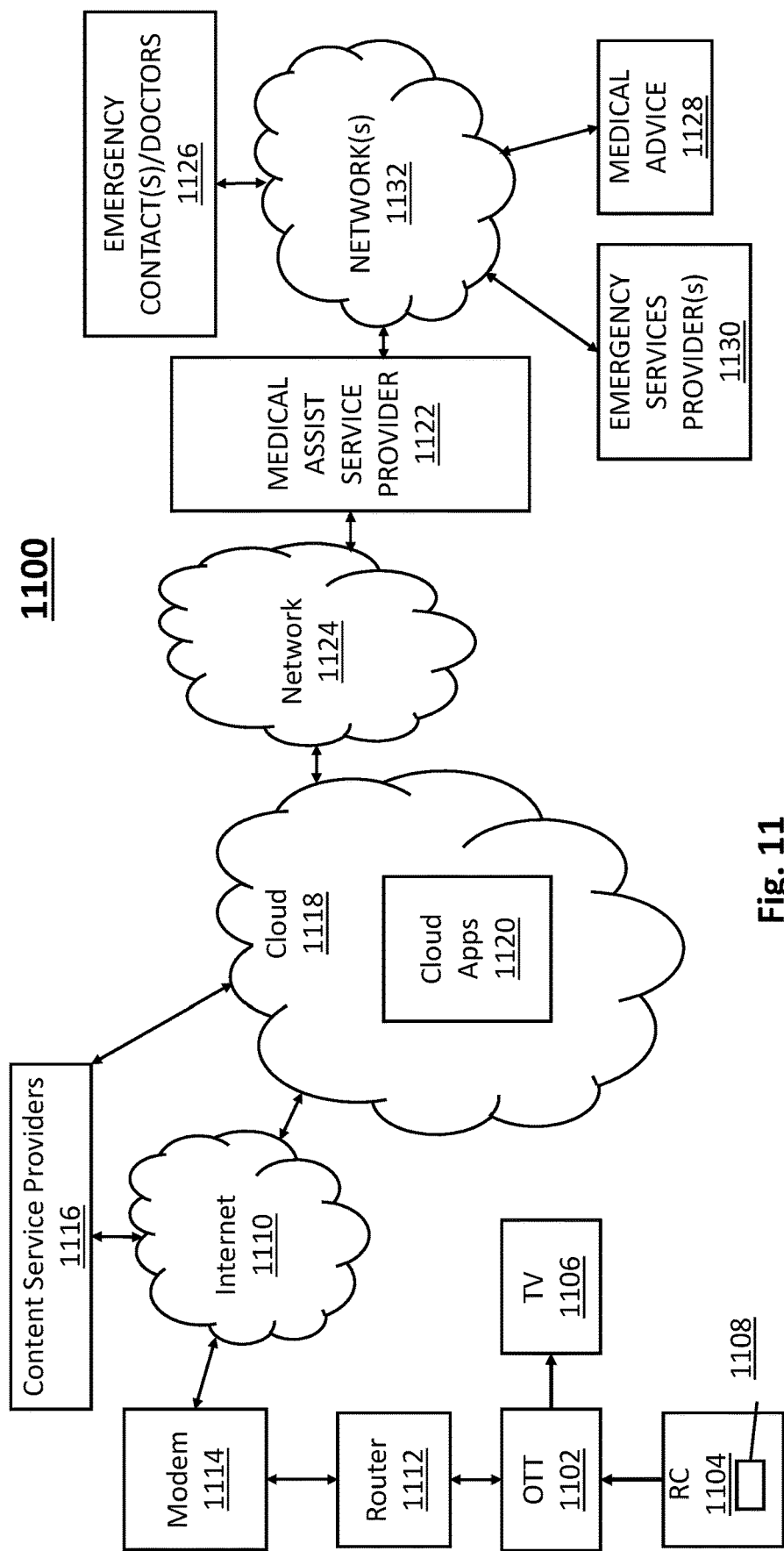

REQUESTING EMERGENCY SERVICES USING A SET-TOP BOX

FIELD OF THE INVENTION

Emergency alert systems, and, more particularly, emergency alert systems using a set-top box and a remote control of a cable television system to obtain medical assistance, police assistance, and/or fire department assistance.

BACKGROUND OF THE INVENTION

There are many commercially available medical alert systems that operate in different manners. Medical alert systems may include a wireless medical alert device in the form of a bracelet or pendant that a user may wear, such as around their neck, for example. Such a wireless medical alert device typically includes a button that a user may press in a medical emergency. In other examples, an App may be provided on a user's smartphone or other smart device. When activated, the wireless medical alert device or the App sends a signal to a station of the provider via Bluetooth or the Internet, for example. The signal includes an identification of the user. When the station receives the signal, the station identifies the user and the location of the user via GPS, for example, and contacts and emergency medical provider, such as an ambulance, police, and/or fire department, for example. In other medical alert systems, an intercom system uses a telephone line in the home to communicate with the medical alert system.

Medical alert systems that rely on the Internet or Bluetooth may not be consistently reliable because the user may be in an area of their home that is not close enough to the Bluetooth receiver or that has poor Internet coverage. Similarly, when outside of the home, a user may be in an area with poor Internet coverage. In these cases, the medical alert cannot be received by the medical alert service provider. In addition, the Internet and Bluetooth networks may not be secure. Users may also not always have their medical alert device on their person, especially when in the home.

In other medical alert systems, one or more monitoring devices are place in a user's home and/or may be used by a user to monitor their health and safety. The many different monitoring devices that are needed may add expense and complexity to the system.

An increasing number of people use their cell phones to call 9-1-1 in order to contact police and fire departments during emergencies. It is not uncommon that a 9-1-1 call may be received without an identification of the address of the caller. While the addresses of landline phones may be associated with an address by a public safety answering point ("PSAP") that receives the 9-1-1 call, using an Automatic Location Identification ("ALI") database, many people no longer have any landline service. Since cell phones are not associated with a fixed location, it is more difficult to precisely determine the location of a cell phone. Triangulation, GPS, and cell tower information have been used to locate cell phones calling 9-1-1. This can be accurate outdoors but the ability to locate a cell phone calling 9-1-1 indoors is limited. In addition, the location data might be in the form of coordinates, which are not readily useable by first responders. While many 9-1-1 services can identify the location of the caller based on a landline call, it may be difficult to determine the location of a person making a 9-1-1 call with a cell phone. In addition, poor cell phone network coverage can limit people's ability to contact the police and fire departments via 9-1-1 service with a cell phone.

SUMMARY OF THE INVENTION

In light of the problems with medical alert systems, it would be advantageous to have a supplemental medical alert system that is readily accessible to a user. It would also be advantageous to have an alternative method to contact 9-1-1 from a home, apartment, or other indoor location, when the person needing assistance is using a cell phone.

Studies have shown that people from 50 to 64 years of age spent on average 5 hours, 43 minutes per day watching television in the first quarter of 2020. People over 65 years of age spent over 6 hours per day watching television. The numbers were similar in the first quarter of 2019. If older people and others who spend large amounts of time watching TV could use their TV system to obtain emergency assistance, such as medical assistance, assistance from the police, and/or assistance from a fire department, it could ameliorate or overcome some or all of the problems discussed above.

In one embodiment of the invention, an emergency alert system is provided that uses a remote control and a set-top box of a cable television system to indicate that a user is having an emergency and a set-top box of the cable television system to securely and reliably convey an emergency alert message to a content distribution system, such as a cable TV system, for example. The content distribution system collects information about the subscriber or other person sending the emergency alert and forwards an emergency alert message to an appropriate party to provide assistance. When the emergency is a medical emergency, a medical alert message may be sent to a medical alert service provider. The medical alert service provider may be third party, such Bay Alert, Concord, California; Medical Alert, Philadelphia Pennsylvania; Life Alert, Life Alert®, Encino, California; LifeLock®, Tempe, Arizona; Philips Lifeline, Framingham, Massachusetts; and ADT, Boca Raton, Florida, for example. The third party medical alert service provider may also be a health care provider, such as a hospital, emergency services clinics, etc. When the emergency alert message is a request for police assistance or the assistance of a fire department, for example, the emergency alert message may be sent to a PSAP of a 9-1-1 service, which conveys the message to the police or fire department.

In accordance with another embodiment of the invention, a method of sending a medical alert is disclosed comprising receiving a medical alert request from a user by a set-top box at a subscriber location. The medical alert request is received by the set-top box from a remote control associated with the set-top box, after actuation of the remote control by the user. A medical alert message is sent by the set-top box based on the received medical alert request to a processing device. A medical alert instruction to provide medical assistance to the subscriber location is sent by the processing device to a medical assistance service provider, via a network. The set-top box and the processing device may be part of a content distribution system, such as a cable television system, for example. The medical assistance service provider may be a third party.

The method may further comprise determining a number of persons at the subscriber location. If it is determined that there is only one person at the subscriber location, a GUI configured to enable confirmation by the user or another person in proximity to the user that medical assistance is needed is populated with a name of the person. The processing device causes display of the graphical user interface on a display device coupled to the set-top box. A confirmation message is received by the set-top box that medical assistance is needed by the user, via the remote control. A confirmation message is sent to the processing device, by the set-top box, if confirmation is received by the set-top box, via the remote control. If confirmation is received by the processing device, the medical alert instruction is sent to the medical assistance service provider, by the processing device. The number of persons may be determined at the subscriber location. The number of persons at a subscriber location and population of the GUIs may be performed by a processing device in the set-top box or a processing device remote from the set-top box, for example.

In accordance with another embodiment of the invention, a method of sending a sending an emergency alert request is disclosed comprising receiving an emergency alert request message by a processing device. The emergency alert request message is received from a set-top box at a subscriber location of a subscriber to a content distribution system, where the set-top box received a medical alert signal from a user at the subscriber location, via a remote control. An emergency alert request to provide emergency services to the subscriber location is sent, by the processing device, to an emergency services provider, across a network. One or more GUIs may be generated, as described above with respect to the first embodiment.

In accordance with another embodiment of the invention, a remote control is disclosed comprising a casing and a processing device. At least one input button is provided in the casing, coupled to the processing device, to control a function of a set-top box, a television, program content, and/or a content distribution system. An emergency alert button is coupled to the processing device. Actuation of the emergency alert button causes the processing device to generate an emergency alert signal. A transmitter is coupled to the processing device. The processing device is configured to cause the transmitter to transmit a first respective signal based on activation of one of the at least one input button and a second signal different from the first signal based on the medical alert signal. The remote control may include a plurality of first input buttons, each assigned to a different respective function. The emergency alert button may comprise a predetermined sequence of input buttons.

In accordance with another embodiment of the invention, a system for providing a medical alert is disclosed comprising a database for storing medical related information. The system further comprises a processing device configured to receive a medical alert message from a set-top box at a subscriber location, across a first network, based on a medical alert request sent by a user at a subscriber location, via a remote control. The processing device is further configured to retrieve medical related information of the user, from the database and send a medical alert request to provide medical assistance to the subscriber location to a medical assistance service provider, across a second network, the medical alert request including information related to the user.

Embodiments of the invention provide a rapid and secure medical alert system for people having an emergency while watching TV. Set-top boxes are more secure than alternative ways of obtaining emergency assistance because they are not susceptible to snooping by hackers and the like. This is because external interaction with the set-top box is limited to a remote control, which only performs a limited number of operations. Embodiments of the invention are particularly advantageous for people who spend a lot of time watching TV. If a person has a medical emergency when not watching TV, the user may turn on the TV to send an alert thought the set-top box, as described above, or may use an alert button or other such device carried by the user and provided by a medical alert service to directly contact the company via the Internet or Bluetooth, for example.

As used herein, the term "set-top box" refers to cable set-top boxes and media digital player, such as Roku, Apple TV, Amazon Fire TV, Xbox, or PlayStation, for example. Digital media players are also referred to as over the top ("OTT") devices. While OTT devices may be less secure than cable set-top boxes, their security may be enhanced by the use of HTTPS messages or the encryption of other types of messages, for example.

BRIEF DESCRIPTION OF THE FIGURES

FIG. 7A and FIG. 7B are examples of GUIs that could be generated by the STB cloud App or the set-top box in FIG. 5 for use in a household with multiple members;

FIGS. 10A-10C show a flow chart of an example of a process performed by the system of FIG. 5 to provide emergency and alert services, in accordance with an embodiment of the invention;

FIG. 11 is a block diagram of a system here the set-top box is an over the top device, in accordance with an embodiment of the invention;

DESCRIPTION OF THE EMBODIMENTS

Figure 1:
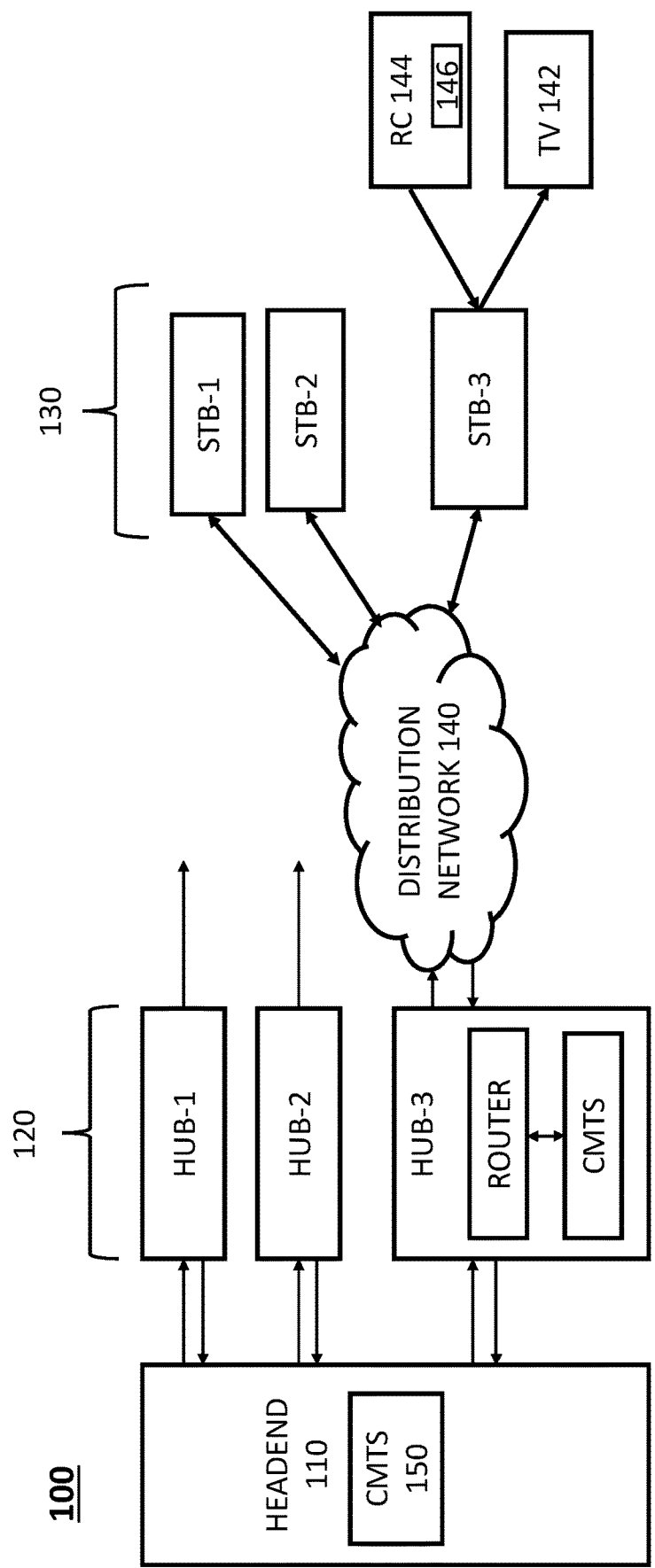
FIG. 1 is a block diagram of an example of a content delivery system ("CDS"), such as a cable television system, for example.

FIG. 1 is a block diagram of an example of a content delivery system ("CDS") 100, such as a cable television system, for example. The CDS 100 in this example comprises a headend 110 in communication with each a plurality of hubs 120, here three hubs denoted as 1 through Hub-3, for example. The headend 110 communicates with and provides program content to the three hubs 120. More or fewer hubs 120 may be provided. Each hub Hub-1 through Hub-3 communicates with and provides program content to a respective group of set-top boxes 130. In FIG. 1, the hub Hub-3 is shown coupled to three (3) set-top boxes 130, here STB-1 through STB-3, via a distribution network (DN) 140. The Hub-3 120 may also be coupled to other customer premises equipment (not shown), including modems and/or routers, via a distribution network 140. The set-top boxes 130 may belong to respective residential and/or commercial subscribers. Only the set-top boxes STB-1 through STB-3 that interact with the hub Hub-3 are shown for ease of illustration. It would be understood by one of ordinary skill in the art that the hubs Hub-1 and Hub-2 are also interact with respective set-top boxes and/or other customer premises equipment via respective distribution networks. In other examples, one distribution network 140 may support communications between multiple hubs 120 and their respective set-top boxes 130. In other examples, communications between the head end 110 and the one or more of the set-top boxes 130 may be direct, such as without using a hub 120, The CDS 100 may be a multi-service operator such as Charter Communications, Stamford, Connecticut; Altice USA, Long Island City, N.Y.; and Cox Communications, Atlanta Georgia, for example, FIG. 1 also shows a television ("TV") 142 and a remote control (RC) 144 coupled to the set-top box STB-3 to control at least certain operations of the TV. The set-top box STB-3 switches between channels of the TV 142, decodes MPEG signals defining audio-visual programs corresponding to a respective channel that are received from the headend 110 for display on the TV associated with the STB-3, and to convey information entered by a user to the headend 110, for example. The STB-3 may be part of the TV 142.

FIG. 1 shows only one TV 142 and one remote control 144 coupled to one set-top box STB-3 for ease of illustration. It is understood that the other set-top boxes shown would have TVs and remote controls coupled to them. The TV 142 may be coupled to the set-top box STB-3 via a cable, such as a coaxial cable, for example. In accordance with embodiments of the invention, along with the other buttons provided on a typical remote control 144 to control the operation of the set-top box 140 and the TV 142, the remote control 144 includes a medical alert button 146, which is discussed in more detail with respect to FIG. 2.

The distribution network 140 may be any one of a number of conventional broadband communications networks that are available, such as a fiber optic network, a telecommunications network, a cable television network and the like. The distribution network 140 may comprise one or more of an optical network, a hybrid fiber coax ("HFC") network for cable, an IP network, a Plain Old Telephone System (POTS) for ADSL, a terrestrial broadcast system like MMDS or LMDS, or a satellite distribution system like DBS, for example.

The headend 110 may include a cable modem communication system ("CMTS") 150, Other components of the headend 110 related to providing program content to subscribers, such as a telemetry data capture device ("TDCD") configured to receive data signals from the cable modem communication system ("CMTS") 150, a session controller, a content asset module, a user interface asset module, and a transport processor, for example, which are known in the art, are not shown or further discussed because they do not relate to embodiments of the present invention. These and other components of the head end 110, and the operation of the head end are described in more detail in US Patent Publication No. 2017/0230211, for example, which is assigned to the assignee of the present application and is incorporated by reference herein.

The Hub-3 in this example includes a router 152 configured to receive downstream data from the head end 110 and propagate upstream data toward head end 110. In addition, in this example, the Hub-3 may also include a cable modem termination system ("CMTS") 154 configured to propagate downstream data toward the set-top box STB-3 via the distribution network 140 and to receive upstream data from the set-top box STB-3 via the distribution network 140. The other hubs 120 may be similarly configured.

Figure 2:
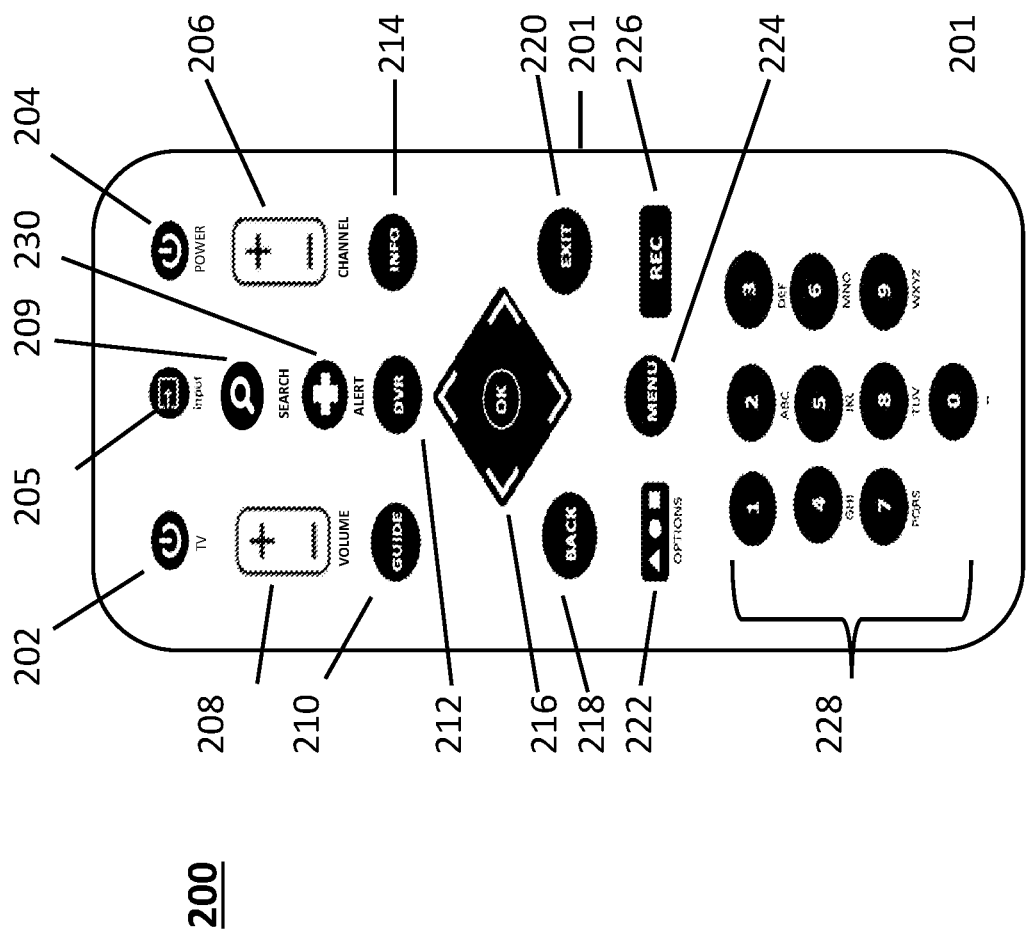
FIG. 2 is a front view of an example of a remote control including an Alert button, in accordance with an embodiment of the invention.

FIG. 2 is a front view of an example of a remote control 200, in accordance with an embodiment of the invention. The remote control 200 has a casing 201 and at least one button, and typically a plurality of buttons, for controlling one or more respective functions of a TV 142, a set-top box 130, and/or a content distribution system 100, as is known in the art. The buttons may be mechanical buttons protruding from the casing and/or touch screen buttons on a surface of the casing, for example. Activation of a button causes a transmitter to generate a unique signal toward the set-top box. The transmitter may be an infrared transmitter, an RF transmitter, a Bluetooth transmitter, or a Zigbee transmitter, for example, as is known in the art.

In this example, the remote control 200 has an on/off button 202 for the set-top box STB-3 and an on/off button 204 for the television. An input button 205 enables switching between different signal input sources, via a displayed menu (not shown). The remote control 200 may also have a channel switch 206 to change the channel of the television and a volume change switch 208 to change the volume. A Search button 209 is provided to search for program searching. A Guide button 210 may be provided to cause display of a program guide on the television 142. A DVR button 212 may be provided to cause display of programs stored in the DVR and/or other DVR functions. An Info button 214 may be provided to cause display of information about a program being watched. A Select button 216 may be provided to enable selection of a program stored in the DVR and other functions. The Select button in this example also includes arrows for moving a cursor or arrow on a graphical user interface, as well as for navigating between screens and views on the graphical user interface, for example. A Back button 218 may be provided to switch from a current channel being viewed to the prior channel viewed, as well as to navigate back to a prior screen or view on the graphical user interface, for example. An Exit button 220 may be provided to exit from a mode, such as a DVR mode when a program stored by the DVR is being watched, for example. An Options switch 222 may be provided to display options related to the program being viewed, such as additional information about the program, and recording the program, for example. A Menu button 224 may be provided to cause display of user menus or interfaces, such as a reservation menu, a playback menu, and a main navigation menu, for example. A Record button 226 may be provided to cause recording of a program currently being viewed on the television, without having to select among the options presented after selection of the Options button 222.

A set 228 of alpha-numeric buttons may also be provided for the entry of a desired channel to view, to switch a channel being viewed, and to enter information on graphical user interfaces that may be displayed on the television, for example. The buttons may only be numeric. The buttons/switches 202-228 are examples of buttons and switches that may be provided on a remote control 200, as is known in the art to provide known functionality. The particular buttons described above are exemplary and more or fewer buttons providing different functions may be provided in any particular remote control.

In accordance with an embodiment of the invention, the remote control 200 further includes an Alert button 230 for causing a medical alert request to be sent to a medical alert system, as described below. The Alert button 230 may have a red cross 232 or other such symbol, for example, to attract the attention of a user, making it easy to find in a medical emergency, for example. The remote control 200 is configured to send an infrared or RF signal that represents a medical alert request, depending on the transmitter provided in the remote control.

Figure 3:
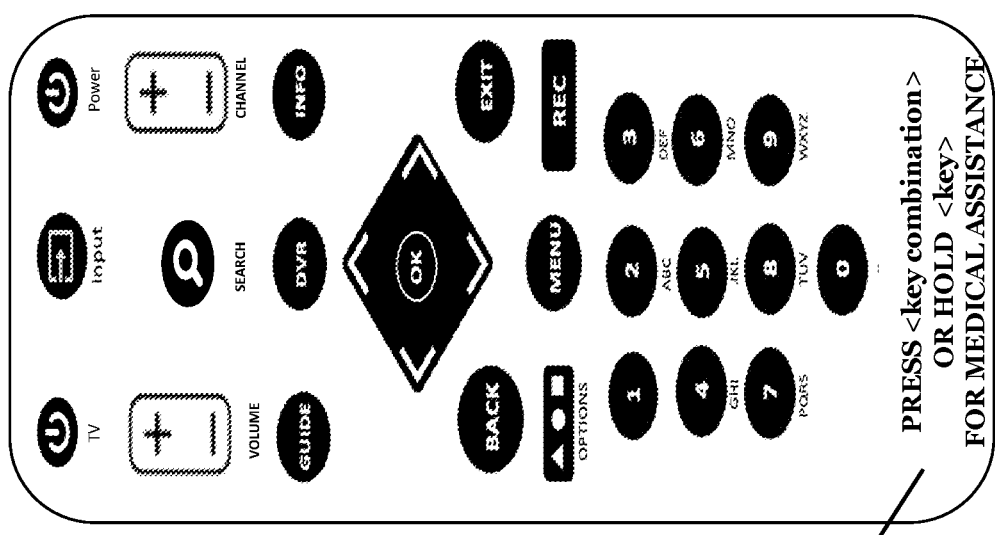
FIG. 3 is an example of a remote control that is similar to the remote control of FIG. 2, in which the Alert button is not provided.

Instead of or in addition to the medical alert button 230, in accordance with another embodiment of the invention, a medical alert request may also be sent by a predetermined combination of numbers or letters entered via the set 228 of alpha-numeric buttons, such as 9-1-1, S-O-S, or another combination of numbers and/or letters. FIG. 3 is an example of a remote control 300 that is similar to the remote control 200 of FIG. 2, in which the Alert button 230 is not provided and the medical alert request is sent via a combination of numbers and/or letters in the set 228 of alpha-numeric buttons. The keys common to the remote control 200 of FIG. 2 are not numbered here. The remote control 300 may include instructions 302 instead of the medical alert button 230 in FIG. 2, such as "PRESS <key combination> OR HOLD <key> FOR MEDICAL ASSISTANCE." In one example, the instructions 302 may read "PRESS <1234> OR HOLD <9> FOR MEDICAL ASSISTANCE." The key combination or the respective key, here 9, to hold to initiate sending of the medical alert message may be pre-programmed by the CDS 100 or may be selected by the subscriber during registration with the CDS 100 or at a later time, for example. The instructions 302 may be in a different color than the buttons/switches such as red, for example. In another example, the remote 300 may also include the medical alert button 230 of FIG. 2, and the user may select the method to send the alert message.

Figure 4:
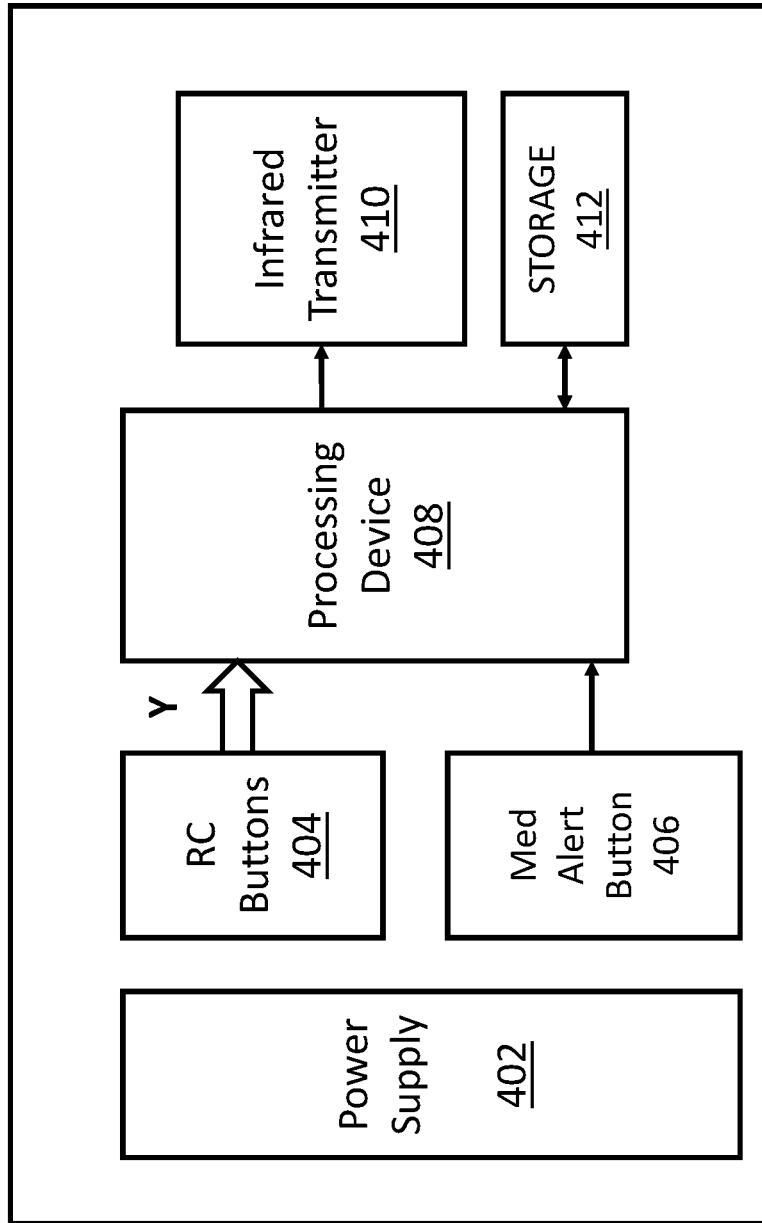
FIG. 4 is a block diagram of an example of some of the components of a remote control, in accordance with an embodiment the invention.

FIG. 4 is a block diagram of an example of some of the components of a remote control 400, in accordance with an embodiment the invention. In this example, the remote control 400 includes a power supply 402, such as batteries, to supply power to the other components of the remote control. The typical buttons provided on a remote control and discussed above are indicated schematically in FIG. 4 by the block 404. The configuration of block 404 is known in the art and may include contact points for each button. The contact points may be arranged in a grid, for example. While the medical alert button 406 provided in accordance with embodiments of the invention is shown separately from the other remote control buttons in FIG. 4 for illustrative purpose, in one example the medical alert button 406 may be included in the grid of contact points used by the other remote control buttons 404. In another example, the medical alert button may have a contact or contacts separate from the grid of contact points used by other remote control buttons, such as if existing remote controls are to be retrofit to include the medical alert button 406.

The remote control 400 also includes a processing device 408, which may be a microprocessor or microcontroller, for example, that receives the signal from a button of the remote control buttons 404 brought into contact with its respective contact point by a user to change a channel, change volume, select a function, etc., as discussed above. The arrow Y extending from the block 404 of remote control buttons to the processing device 408 indicates multiple connectors from the grid to the processing device. Typically, two connectors are required to define a respective button in the grid. If the medical alert button 406 is part of the same grid as the other remote control buttons, then signals would be provided along two respective connectors when the medical alert button is depressed by a user, as well. If the medical alert button 406 is not part of the same grid as the other remote control buttons 404, then one or two connectors may be provided from the medical alert button to the processing device 408.

The processing device 408 determines which button is brought into contact with a respective contact based on which two connectors provide signals to the processing device. The processing device 408 then generates a unique series of pulses corresponding to the pressed button and provides the series of pulses to a transmitter 410. A table correlating respective buttons with pulse sequences may be stored in the storage 412, for example. The transmitter 410 may be an infrared transmitter or an RF transmitter, for example.

An infrared transmitter includes one or more light emitting diodes (LEDs) (not shown), for example, to generate infrared light pulses corresponding to the receive pulses from the processing device 408. The infrared light pulses are received by an infrared receiver in the set-top box, as discussed below. Infrared remote controls and set-top boxes with infrared receivers are well known in the art. It would be apparent to one of ordinary skill in the art other electronic components may be provided in the remote control.

An RF transmitter (not shown) includes an antenna for transmitting the RF pulses, as is known in the art. A remote control with an RF transmitter would be used with a set-top box with an RF receiver. RF remote controls and set-top boxes with RF receivers are well known in the art. As mentioned above, the remote control 400 may also be a Bluetooth or Zigbee remote control. Universal remote controls may include multiple types of transmitters.

Figure 5:
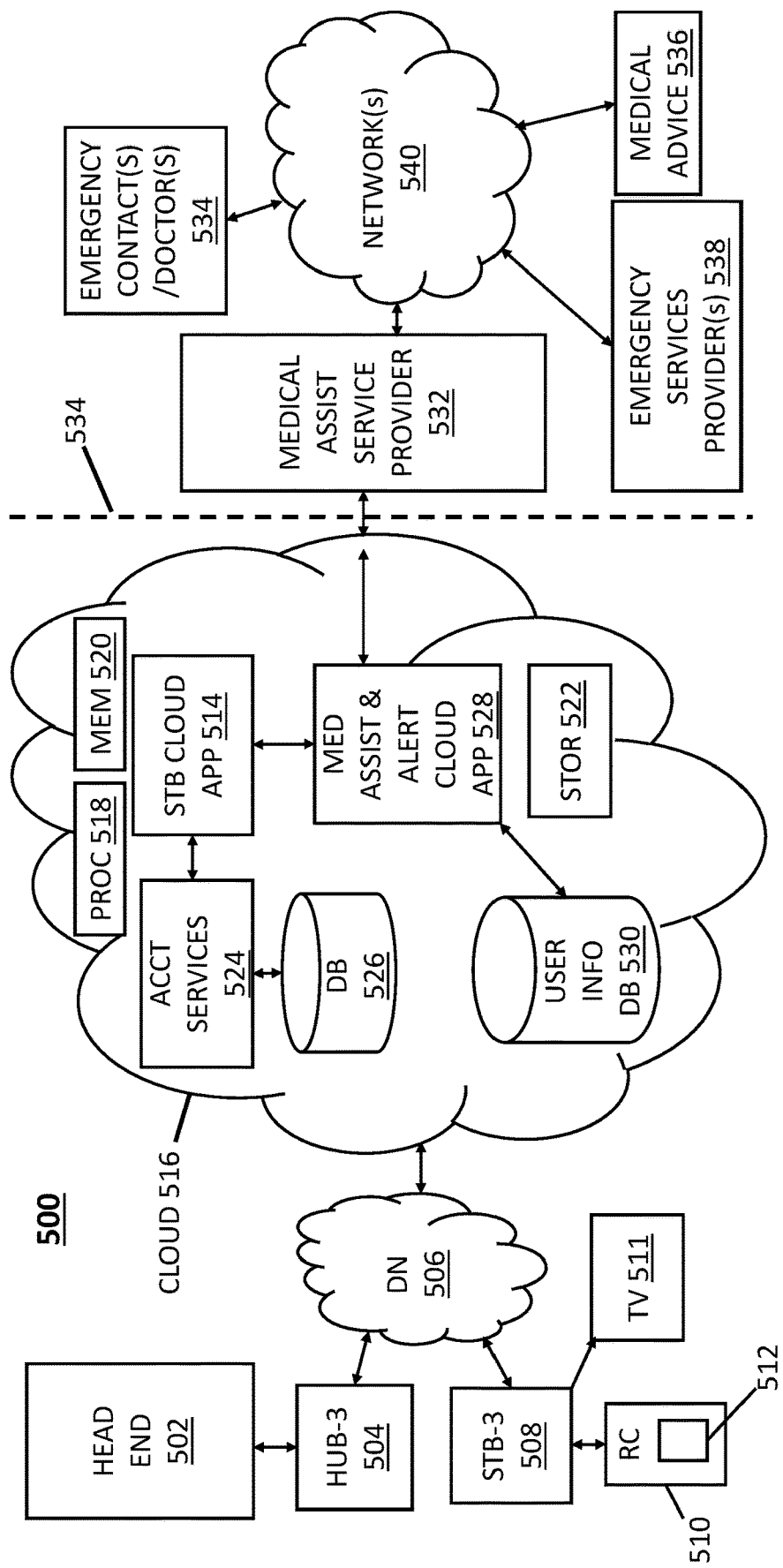
FIG. 5 is a block diagram of an example of a system for providing medical assistance in accordance with an embodiment of the invention.

FIG. 5 is a block diagram of an example of a system 500 for providing medical assistance in accordance with an embodiment of the invention. The system 500 of FIG. 5 includes a portion of the CDS 100 of FIG. 1, here a head end 502, one hub-3 504, a distribution network (DN) 506, one set-top box 508 and its associated remote control 510 and TV 511. A block 510 represents the medical alert button 230 of the remote control 200 of FIG. 2 and the key combination or key of the remote control 300 of FIG. 3. It should be understood that while the Hub-1 and the Hub-2, and their associated distribution networks and set-top boxes (not shown in FIG. 1) in this example would also be coupled to the system 200 via a respective distribution network, they are not shown to simplify the illustration.

The system 500 also includes a set-top box ("STB") cloud application ("App") 514 that resides in the cloud 516. As is known in the art, the STB cloud App 514 in a content distribution system, such as the CDS 100 of FIG. 1, interacts with the set-top box 508 to provide graphical user interfaces, such as a program guide, for example, as well as to control play back of recorded programs and to perform trick functions on recorded programs stored in the cloud, such as fast forward, rewind, and pause, as is known in the art. The cloud 516 may be a private cloud, for example. The STB cloud Apps may also be hosted in a cloud platform, such as Amazon AWS or Microsoft Azure, for example. The STB cloud App 514, and other cloud Apps described herein are run by one or more virtual processing devices (PROC) 518, as is known in the art. Other virtual components, such as virtual memory (MEM) 520, such as virtual random access memory ("RAM") or virtual dynamic RAM ("DRAM"), for example, and virtual storage (STOR) 522, such as a one or more hard drives or solid state storage devices ("SSDs"), are also used as needed.

In the example of FIG. 5, the STB cloud App 514 interacts with the set-top box 508 via the cloud 516 and the distribution network 506. The STB cloud App 514 may include a plurality of microservices dedicated to specific functions. In addition to the functions described above, in accordance with this embodiment of the invention, the STB cloud App 514 is further configured to perform functions related to the medical alert system, including interacting with other cloud Apps to validate a user sending a medical alert and populating appropriate graphical user interfaces related to the medical alert for display by the set-top box 508, as described in more detail below. These further functions of the STB cloud App 514 may be performed by additional respective microservices of the STB cloud App. In other examples, another cloud App separate from the STB cloud App 514 may be provided to perform any or all of the medical alert related functions. Messages may be sent between the set-top box 508 and the set-top cloud App 514, as well as among other components in the cloud, via HTTP, HTTPS, TCP, UCP, or UBP messages, for example, as is known in the art. In one example, messages are sent between the set-top box 508 and the distribution network 506, and between the distribution and the cloud 516 via HTTPS messages, which are encrypted via transport layer security (TLS) and are therefore secure. In this example, messages between components of the cloud 518 may be HTTP messages, because the cloud 518 is a secure environment. As is known in the art, HTTP messages are faster than HTTPS messages.

Figure 12:
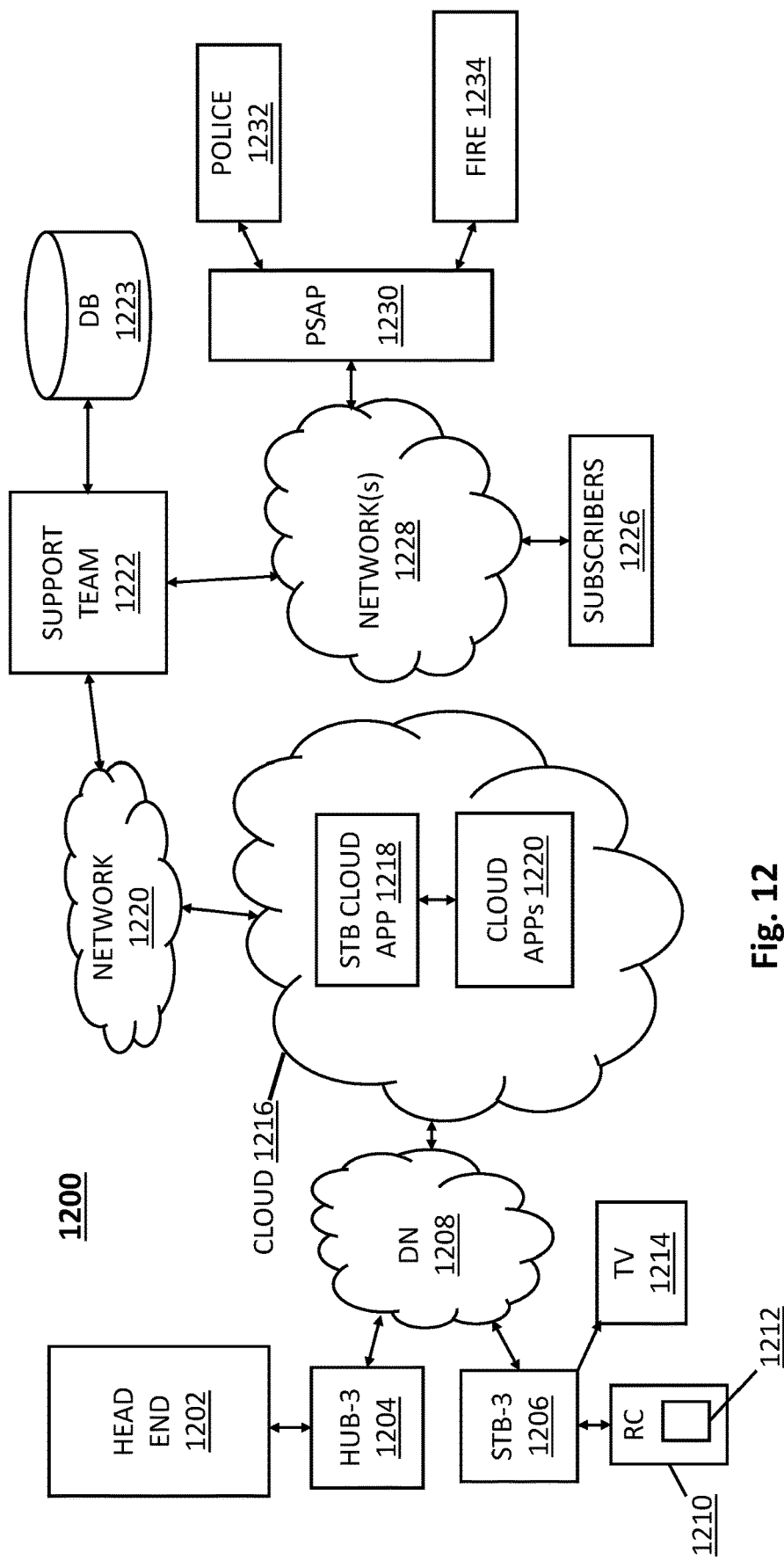
FIG. 12 is block diagram of an example of a system for providing emergency services in accordance with an embodiment of the invention.

In other examples, the functions performed by the STB cloud App 514 and other cloud Apps described herein may be performed by a non-virtual processing device, such as a central processing unit, microprocessor, or microcontroller, residing on a computer or server under the control of suitable software, or combination of software and hardware, for example, as discussed with respect to FIG. 12. These functions may also be performed by a suitably configured application-specific integrated circuit (ASIC), for example.

The system 500 also includes an account services cloud App 524 that may also include a plurality of microservices, each performing aspects of the account services related to the CDS 100 of FIG. 1, as is known in the art. Such services may include maintaining subscriber personal information (subscriber name, address, phone number, for example), subscriber payment information, subscriber service information, subscriber equipment information, etc. Such information may be correlated with the media access control ("MAC") address of a subscriber, for example. The account services cloud App 524 may access account services related information from one or more databases 526, for example.

After receiving a medical alert message from the set-top box 508, the STB cloud App 514 queries the account services cloud App 524 for subscriber and household information correlated with the MAC address of the set-top box 508. In one example, the STB cloud App 514 may request that the account services cloud App validate the subscriber to confirm that a subscriber is a current, fully paid and active subscriber to the CDS system 100 and is registered with the system 500 for providing medical services. If so, the account services cloud App 524 provides the name, address, and phone number of the subscriber, and identifies the names of other members of the household or other location where the set-top box 508 is located.

The set-top box 508 may be located in a health care facility, such as an assisted living facility, nursing home, or group home, for example, where the medical alert function would be particularly useful. In this case, the STB cloud App 514 may request the name of the health care facility, the address of the health care facility, and the names of each person in the health care facility is provided.

Based on the information provided by the account services cloud App 524, the STB cloud App 514 in one example generates an appropriate graphical user interface ("GUI") for the person requesting medical assistance to confirm that they need such assistance. If there is more than one person in the household or facility, the STB cloud App 514 may populate a GUI with the name or names of the people who may be present and could have requested medical assistance, so that the person who needs the medical assistance may be identified. After the person who needs medical assistance is identified, a confirmatory GUI may be sent. The GUI(s) may be sent to the set-top box 508 via the cloud 516 and the distribution network 506, for display on the TV or other display device associated with the set-top box. Other people present could also act on behalf of the person sending the medical alert. For example, one spouse may send the medical alert for another spouse and a health care worker may send the alert for a resident of a health care facility, for example. One resident may also send the alert for another resident. Examples of interfaces are discussed below.

GUI(s) sent by a cloud-based App, such as the STB cloud App 514, is referred to as a cloud-based interface. Alternatively, the set-top box 508 may generate and populate a GUI and launch it on the TV or other display device, upon receipt of the medical alert message from the remote control 510. This is referred to as a local interface. In this example, the set-top box 508 is configured to populate and launch a GUI stored in the set-top box. The set-top box 508 may directly query the account services cloud App to validate the subscriber, populate the GUI, via the cloud 516 and the distribution network 506.

Figure 6:
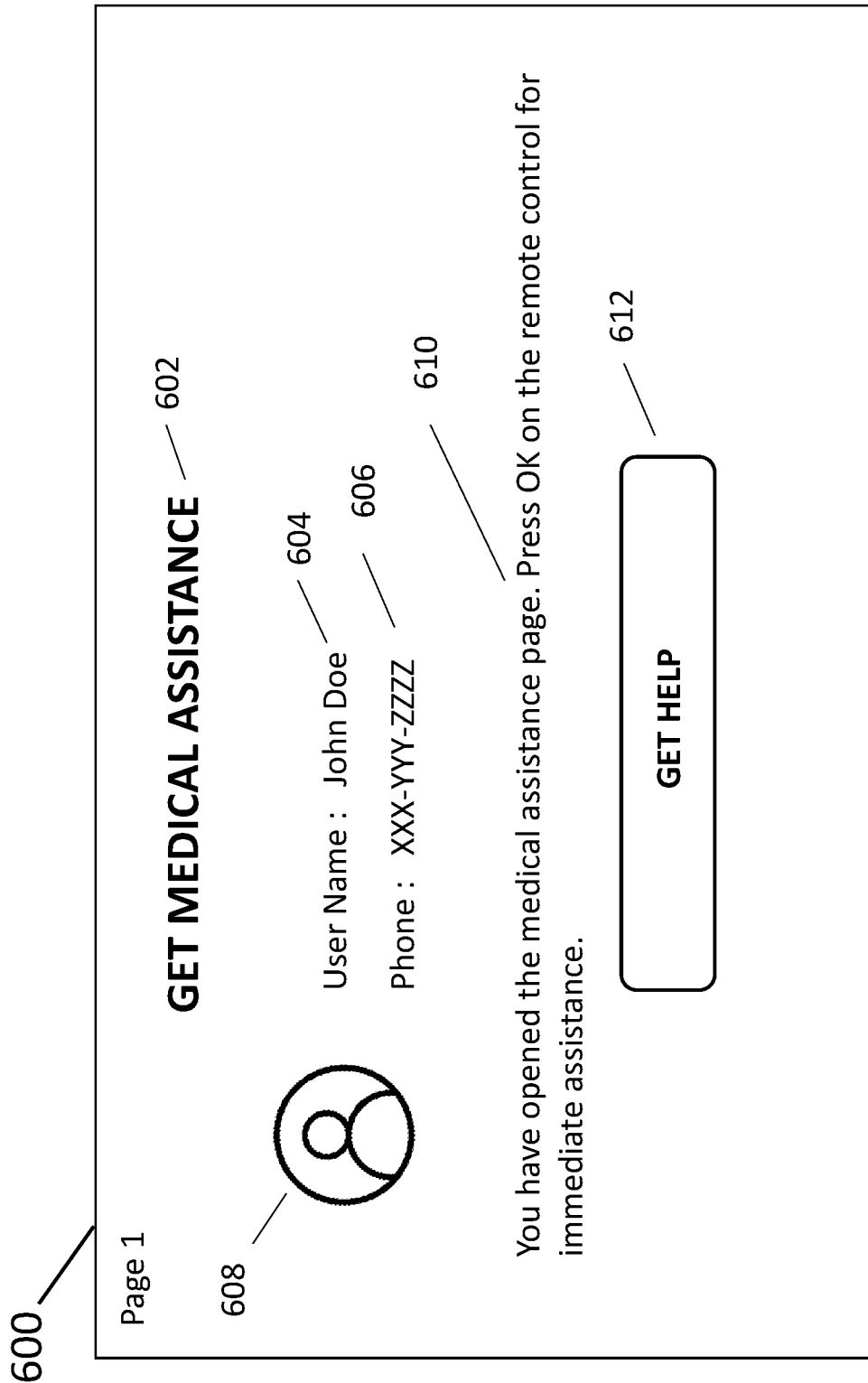
FIG. 6 is an example of a GUI that could be generated by a STB cloud App or a set-top box 508 for use by the someone in a home, for example.

FIG. 6 is an example of a GUI 600 that could be generated by the STB cloud App 514 or the set-top box 508 for use by the someone in a home, for example. The GUI 600 in this example includes a title 602 "GET MEDICAL ASSISTANCE," to identify the GUI for the user. In a situation where the subscriber is the only person in the household, a field 604 is provided that has been populated with the subscriber's name. Another field 606 is provided that has been populated with the subscriber's phone number. The GUI 600 may also include a picture 608 of the subscriber. The GUI 600 may also include exemplary text 608 with instructions to the subscriber. In this example, the instructions are: "You have opened the Medical Assistance Page. Press OK on your Remote Control for immediate assistance." If the remote control does not include an OK key but instead includes a Select key, the text 610 may read "You have opened the Medical Assistance page. Press Select on your Remote Control for immediate assistance," for example. There is also a banner 612 below the instructions reading: "Get Help." The banner 612 may be in red or another bright color to attract attention. Other instructions may be included instead of or in addition to the exemplary instructions shown in FIG. 6 and the GUI 600 may have a different configuration.

When the user presses the Select Key or the OK key, in the example of FIG. 5, a confirmatory message is sent to the STB cloud App 514, via the distribution network 506 and the cloud 518. Confirmation is requested in this example to conform that the medica alert button was not activated by mistake. In another example, the Get Help banner 612 may include a link so that selecting on the Get Help banner via the remote control 510 sends the confirmatory message. The Get Help banner 612 may be selected via the Select button 216 in FIG. 2, for example.

Figure 7B:
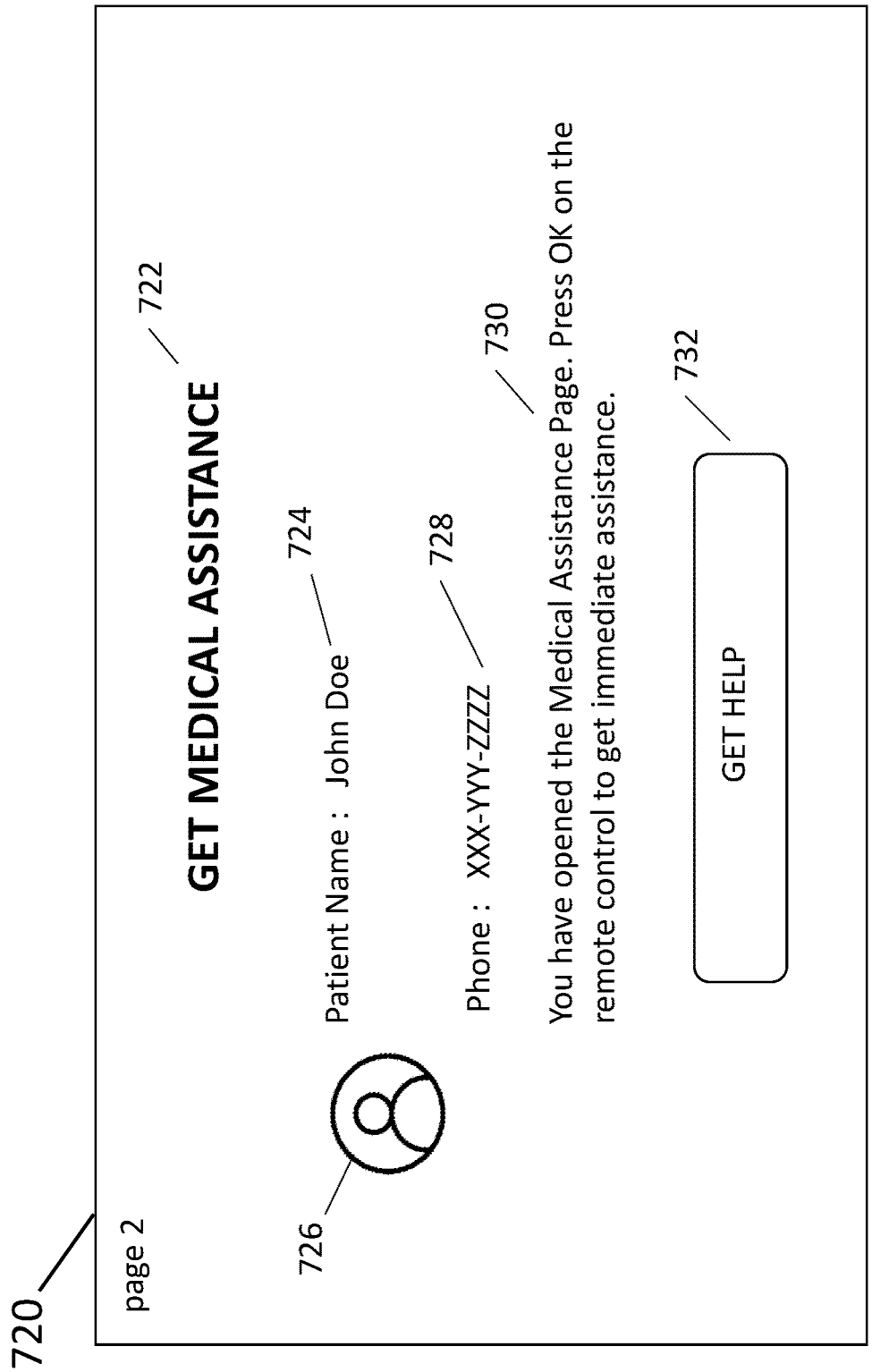

FIG. 7A is an example of a GUI 700 that could be generated by the STB cloud App 514 or the set-top box 508 in FIG. 5 for use in a household with multiple members. In this example, there is the subscriber, the subscriber's spouse, and the subscriber's child. The GUI 700 in this example includes a title 702 "SELECT PATIENT," to identify the GUI for the user. A field 704 is provided that has been populated with the subscriber's name. Another field 706 is provided that has been populated with the name of the subscriber's wife. Another field 708 is provided that has been populated with the name of the subscriber's child. Pictures 712, 714, 716 each respective party are also provided.

In operation, the party needing medical assistance may advance a cursor or arrow over their name or picture and clicking, using the Select button 216 on the remote control 200 in FIG. 2, for example. When the arrow is placed over each person, the person's name and picture may be highlighted.

The set-top box 508 then sends the selection to the STB cloud App 514 via the distribution network 506 and the cloud 516 of FIG. 5. In one example, the STB cloud App 514 may provide the name of the identified person to the account services App 524, to obtain confirmation that the identified person is registered with the medical alert system and obtain additional information about the person, such as their phone number and address, for example. The STB cloud App 514 populates a second page 720 of the GUI 700, shown in FIG. 7B, based on the selection and any additional information received from the account services cloud App 524. The second page 720 of the GUI 700 corresponds to the GUI 600 of FIG. 6 and has the same title 722 "GET MEDICAL ASSISTANCE." The second page 720 of the GUI 700 also includes the name of the party needing medical assistance, here Patient Name 724, a picture of the patient 726, phone number of the patient 728, instructions 730 (the same as in FIG. 6) and Get Help banner 732. The patient or other person with the patient may confirm that medical assistance is needed by depressing the Select or OK keys, as above, which sends a confirmatory message to the STB cloud App 514 in FIG. 5.

Figure 8A:
FIG. 8A and FIG. 8B are examples of GUIs that could be generated by the STB cloud App or the set-top box in FIG. 5 for use in medical a health care facility.
Figure 8B:
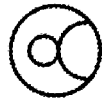

FIG. 8A and FIG. 8B are two pages 810, 840, respectively, of an example of a GUI 800 for use in a multi-person facility, such as a nursing home, assisted living, or group home, for example, where there may be many people watching the same TV coupled to a set-top box 508 in a common area. As in the example of a multi-person household, the first page 810 of the GUI has the title 820 SELECT PATIENT so that the person requesting medical assistance or the person needing medical assistance can be identified. In this example, there may be many more people to select from. The first page 810 of a GUI includes fields with the names and pictures of nine (9) different people, collectively identified as 830. More people may be added to the first page 810 by making the names and pictures smaller, for example. In addition, or alternatively, several pages of names and pictures of residents of the health care facility may be provided.

The person having the medical emergency may identify themselves or another resident of the facility may identify the person needing medical assistance by advancing a cursor or arrow on the GUI 810 with the remote control 200, 300, with the Select button 216, for example. When the arrow is placed over each person, the person's name and picture may be highlighted. The OK or Select button may be selected when the proper person is reached. If there is more than one page of names of facility members, an arrow or other indication (not shown) may be provided on the first page 810 of the GUI 800 to indicate that the next page of names should be displayed. The selected name is sent to the STB cloud App 514 via the distribution network 506 and the cloud 518.

The STB cloud App 514 may provide the name of the identified person to the accounts services App, as discussed above with respect to FIG. 7, to obtain additional confirmation that the identified person is registered with the medical alert system. If the identified person is registered, the account services App may provide additional information related to the selected person, such as the person's address and/or phone number, for example, if that information has not already been provided. The STB cloud App 514 populates the second page 840 of the GUI 800 with the name 842 and address 842 and/or phone number of the identified person, along with the name 846, address 848, and phone number 850 of the facility. The second page 840 of FIG. 8B corresponds to the GET MEDICAL ASSISTANCE pages 720 and 600 but may include additional information related to the health care facility. Instructions 852 and a GET HELP banner 854 are similarly provided, as discussed above.

The STB cloud App 514 sends the populated second page 840 to the set-top box 508 for display on the TV or other display device in order to receive confirmation that medical assistance is needed. The person requesting the medical alert, or another person, may confirm by selecting OK or Select button, depending on the remote control 200, 300, while the second, GET MEDICAL ASSISTANCE page 840 of the GUI 800 is displayed. If the STB cloud App 514 has already obtained the additional information concerning those in the health care facility when the names were requested, then the STB cloud App 514 may populate the second page 840 of the GUI 800 without requesting the additional information from the account services App 524.

If medical assistance is needed, and the medical alert button was not pressed by mistake, the person needing assistance or another person, clicks on the OK or Select button on their remote control 200 to send a confirmatory signal or message to the set-top box 508. After receiving the confirmatory message from the remote control, the set-top box 508 generates a confirmatory message to the STB cloud App 514, via the distribution network 506 and the cloud 518. As above, the message may be an HTTP, HTTPS, TCP, or UDP message, for example. In one example, the message is an HTTPS message, as discussed above.

Returning to FIG. 5, the system 500 further includes a medical assistance and alert cloud App 528 and a user information database 530. While the medical assistance and alert cloud App 528 and a user information database 530 both reside in the cloud 516, either or both of may also reside on dedicated hardware devices, such as servers or computers, for example, and may be run by a central processing unit, microprocessor, or microcontroller, for example. The user information database 530 includes medical related information of the subscriber, other household members, and health care facility members. The medical information may associate with each person's name, their date of birth, emergency contact information, a priority listing of multiple emergency contacts if there is more than one emergency contact, their doctors' names specialties, and phone numbers, and the name and phone numbers of near-by hospitals, for example. The user information database 530 may also include medical history information, such as current conditions and family health history, as well as blood type, the results of blood tests and other tests, etc. The information may also be associated with the MAC address of the set-top box 508 in the household or health care facility, and/or with a name or address of registered users, for example. The medical related information in the medical assistance and alert cloud App 528 may be provided during registration of a subscriber and household members with the system 500, or at other times, for example. The medical related information may be updated as new information becomes available. Health related information stored in the user information database 530 may be transmitted by the party sending the information and stored in accordance with HIPAA privacy rules. For example, a patient may give permission to a health care provider to transmit the patient's health care related information to the CDS 100 for storage in the user information database 530. The health care provider may send the information to the medical assistance service provider 532, for example, or the medical assistance service provider 532 may query the health care provider for the information. The medical assistance service provider 532 may then send the information to the medical assistance and alert cloud App 528, which stores the information in the user information database 530. The user information database 530 may be a secure database, such an Oracle, Amazon Aurora DB, or MySQLA relational database, for example. The database may also be a secure non-relational database. While shown separate from the account services database 526, the information stored in the user information database may be stored in the account services database.

During registration, a subscriber and other members of the subscriber's household or facility may provide each person's name, address, phone number, date of birth, contacts, doctor(s), hospital(s), etc., to the system 500. The information may be provided to the set-top box cloud App 514, for example, which can forward it to the medical assistance and alert cloud App 528 for storage in the user information database 530, for example. The information may be provided in a registration GUI (not shown) sent by the set-top cloud App 514, for example. The subscriber, other registrants, their doctors, and other service providers, may also provide, store, and transmit health related information, such as blood tests, medical conditions, etc., in a manner consistent with HIPAA privacy rules. Information may be updated as needed.

When the STB cloud App 514 receives the confirmatory message from the set-top box 508, the STB cloud App instructs the medical assistance and alert system 528 to retrieve the medical related information for the person needing medical assistance database 530 for the information associated with the MAC address and/or name or address of the registered person who needs medical assistance from the user information database 530. The medical assistance and alert cloud App 528 receives the information and provides the information to a medical assistance service provider 532 in or with an instruction to provide medical assistance, via the cloud 516. The information may be encrypted and HIPAA compliant, for example, to ensure confidentiality and integrity of the information.

In this example, the medical assistance service provider 532 is a third party, as indicated schematically by the broken line 534. The file may be sent in an SMS, HTTP, or an HTTPS message, for example. In one example, the file is sent in an HTTPS message for security, as discussed above. As mentioned above, in one example, medical assistance may be provided to all subscribers, whether they are registered or not. Non-registered people would not have medical related information stored in the user information database 530. In that case, only the person's name, address, and phone may be provided to the medical assistance service provider 532.

The third-party medical assistance provider 532 may receive the file by an interface, such as a cloud App of the third-party medical assistance provider, residing in its own cloud (not shown). The third-party's cloud App may communicate with other portions of the third-party medical assistance provider after receipt of the file or message, via the Internet, for example. The third-party medical assistance provider may be a commercial emergency medical assistance provider, such as Life-Lok®, Philips Lifeline, or ADT, for example. The CDS 100 may contract with respective medical assistance service providers already used by respective users, for example, or may contract with one or more exclusive medical assistance service providers to handle alerts coming from a user of the CDS 100, for example. In other examples, the medical assistance provider may be part of the system 400.

The medical assistance service provider 532 may: 1) contact the user directly via phone, for example, to ascertain the seriousness of the medical emergency and possibly render advice; 2) contact the emergency contacts and/or doctor 534 identified in the file; 3) connect the user with a medical practitioner at a hospital, medical clinic, or doctors on their own staff, or provide the medical practitioner with the user's phone number, so that they can provide advice 536; and/or 4) contact one or more emergency services providers 538, such as an ambulance, fire department, and/or police department, and provide them with the user's address so that they can go to the user's location, for example. The medical assistance service provider 532 may contact each of these parties via one or more networks 540, such as the Internet, a cell phone network, a landline network, a satellite network, and/or an SMS network, etc. Different parties may be contacted via different networks. For example, the medical assistance service provider may contact the one or more emergency contacts and a medical practitioner via a cellular or landline phone network and contact emergency services via a satellite network, for example.

Depending on the situation, the medical assistance service provider 532 may perform any or all of these functions, in any order. In one example, the medical assistance service provider 532 may have a medical practitioner call the user, and then the medical assistance service provider may contact an emergency contact. The medical assistance service provider may also escalate from function to function as a situation deteriorates. Depending on the results of the conversation between the medical practitioner and the user, for example, the medical practitioner may instruct the medical assistance service provider 532 to contact an emergency services provider 538 so that an ambulance will be sent to the location, for example. In another example, the user's medical history may indicate that the user sent a medical alert message recently for a serious condition. In that case, an emergency services provider 538 may be contacted immediately, and then emergency contacts 534 may be contacted. Under those circumstances, a medical practitioner may or may not be contacted. In another example, the medical assistance service provider 532 may always contact an emergency service. In one examples of this and other embodiments of the invention described herein, without limiting the scope of the embodiments of the inventions, it is estimated to take from about 5 to about 10 seconds for each message to be sent from a remote control to the STB cloud App 514 and for each GUI to be sent to the set-top box 508, and it is estimated to take from about 15 seconds to about 30 seconds for the third party medical assistance service provider 532 to be contacted by the medical assistance and alert cloud App 528 and initiate appropriate action.

As discussed above, if the user has not registered with the system 500, the system will not have contact information or medical related information for the person. In that case, the system 500 can only send emergency services, such as an ambulance, to the address of the subscriber. Even if a subscriber has not registered with the medical alert system option of the system 500, however, if the third party medical assistance service provider 532 happens to be used by the person needing medical assistance for other types of medical assistance, the third party medical assistance service provider 532 may already have information about the person sending the medical alert. In that case, the third party medical assistance service provider 532 may already have contact and medical related information stored in its own databases, for example. The third party medical assistance service provider 532 may, therefore, access their own information after receiving the medical alert message from the medical assistance and alert cloud App 528, and respond accordingly.

Figure 9:
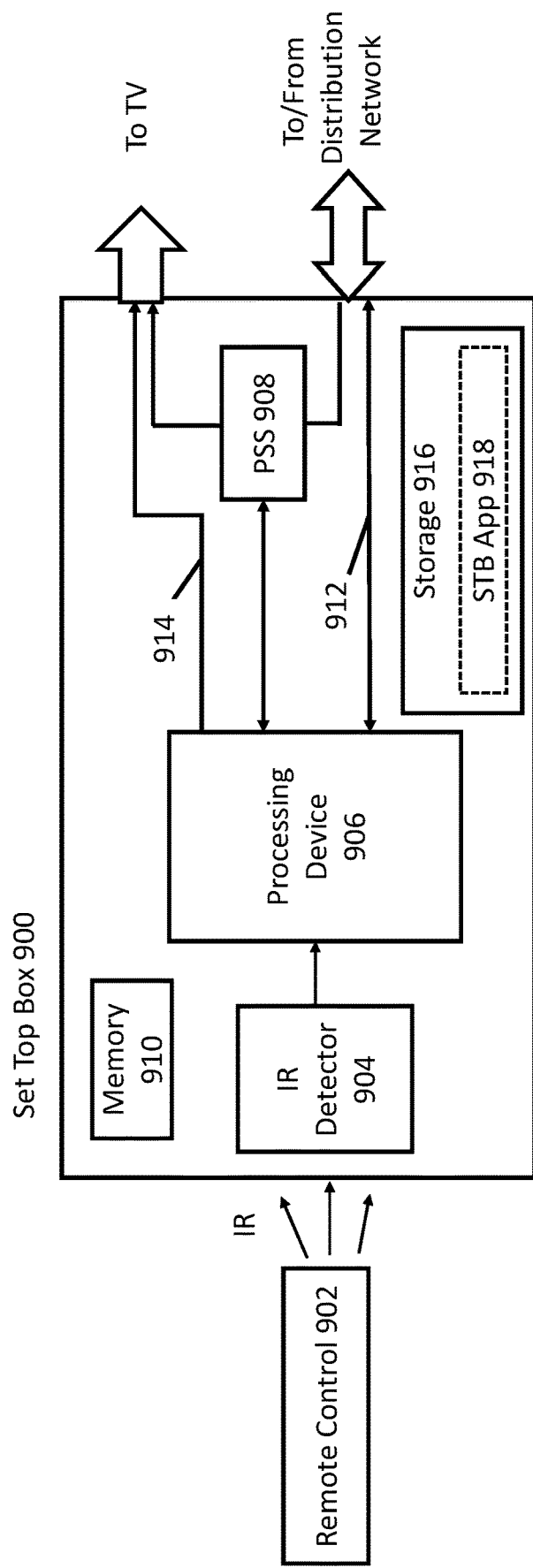
FIG. 9 is a block diagram of an exemplary set-top box in accordance an embodiment of the invention.

FIG. 9 is a block diagram of an exemplary set-top box 900 in accordance an embodiment of the invention. A remote control 902, such as the remote control 400 of FIG. 4, is shown in proximity with the set-top box 900. The remote control 902 is shown emitting infrared pulses IR toward an IR detector 904 of the set-top box 900. The infrared detector and/or circuitry downstream of the infrared detector converts the infrared pulse into digital signals and provides the digital signals to the processing device 906. A processing device 906 sends control signals to the TV based on the detected infrared pulses to control certain TV functions, such as turning on and off the TV, controlling the volume of the TV, etc. The processing device 906 may be a central processing unit, a microprocessor, or a microcontroller, for example.

The set-top box 900 also includes components for tuning to a respective program stream of a plurality of program signal streams provided by the headed of the cable television network, decode the programming content, which may be in the form of MPEG program signals, perform trick functions on the programming content, and perform other functions related to the program signal stream, as is known in the art, for example. The components of the set-top box 900 performing such functions, which are well known in the art, are schematically represented by the program signal stream ("PSS") block 908 which is shown receiving program signal streams from the head end, such as the headend 502 of FIG. 5, via a distribution network, such as the distribution network 506 of FIG. 5, and providing a respective program signal stream to the TV for display. The processing device 906 determines the channel to be tuned to, based on the received IR pulses. The processing device 906 may also control other functions of the set-top box 900, such as the performance of trick functions on stored or received programming, for example, based on the received infrared pulses. The set-top box 900 may provide a program signal stream to the TV via a coaxial cable, for example. It is noted that in certain systems, infrared signals to increase or decrease the volume on the TV may be detected by an infrared detector in the TV, not the set-top box 900.

In addition, as discussed above, in this example, the set-top box 900 receives GUIs, such as the GUIs shown in FIGS. 6-8B, for example, from the STB cloud App 514 in FIG. 5 and displays the respective GUI on TV. GUIs may be stored in a memory 910 prior to display, for example. The GUIs may be received by the set-top box 900 with the program signal stream, via the distribution network 506, or may be received out of band, for example. The GUI(s) may be provided to the processing device 906 along line 912, for example, and provided to the TV for display along line 914, for example. As discussed above, the user confirms that the medical alert was sent via the remote control 902. Infrared signals generated by the remote control 902 in response to the selection are sent to the set-top box 900, received by the infrared detectors 904, converted to digital signals, and received by the processing device 906, which sends the response to the STB cloud App 514 along the line 912. The response may be sent to the STB cloud App 514 via the distribution network 506 and the cloud 516 of FIG. 5, for example.

Storage 916 is also provided to store programs for controlling operation of the processing device 906, for example. The storage 916 may also store recorded programming content in the case of a set-top box DVR, for example.

A STB App 918 is shown in phantom in in the storage 916, which would be used if the set-top box 900 is a local interface set-top box. In this embodiment of the invention, when a medical alert message is received by a local interface set-top box 900 from the remote control 902, the functions of the STB cloud App 514 discussed above are performed by the processing device 906, under the control of the STB App 918. In this case, the set-top box 900 generates and populates GUIs and launches them on the TV or other display device. Templates of the GUIs may be stored in the storage 916 or the memory 910, for example. The set-top box 900 in this case may also control performance of other, program related functions, such as the performance of trick functions, for example. The STB cloud App 514 does not, therefore, control operation of the local interface set-top box 900. Since some subscribers in the CDS 500 may have a local interface set-top box and other subscribers may have a cloud-based interface set-top box, the STB cloud App 514 may still be provided in the cloud 516 to control operation of cloud-based interface set-top boxes.

In the example of a local interface set-top box, the processing device 906 communicates directly with the account services cloud App 524, via the distribution network 506 and the cloud 516, to collect required information, populates the GUIs, and causes the set-top box 900 to display the GUIs on the TV. After confirmation of the medical device alert via the GET MEDICAL ASSISTANCE GUIs 600, 720, 840, for example, the processing device 906 sends a message to the medical assistance service provider 532 to continue the medical alert process, as described above.

Figure 10A:
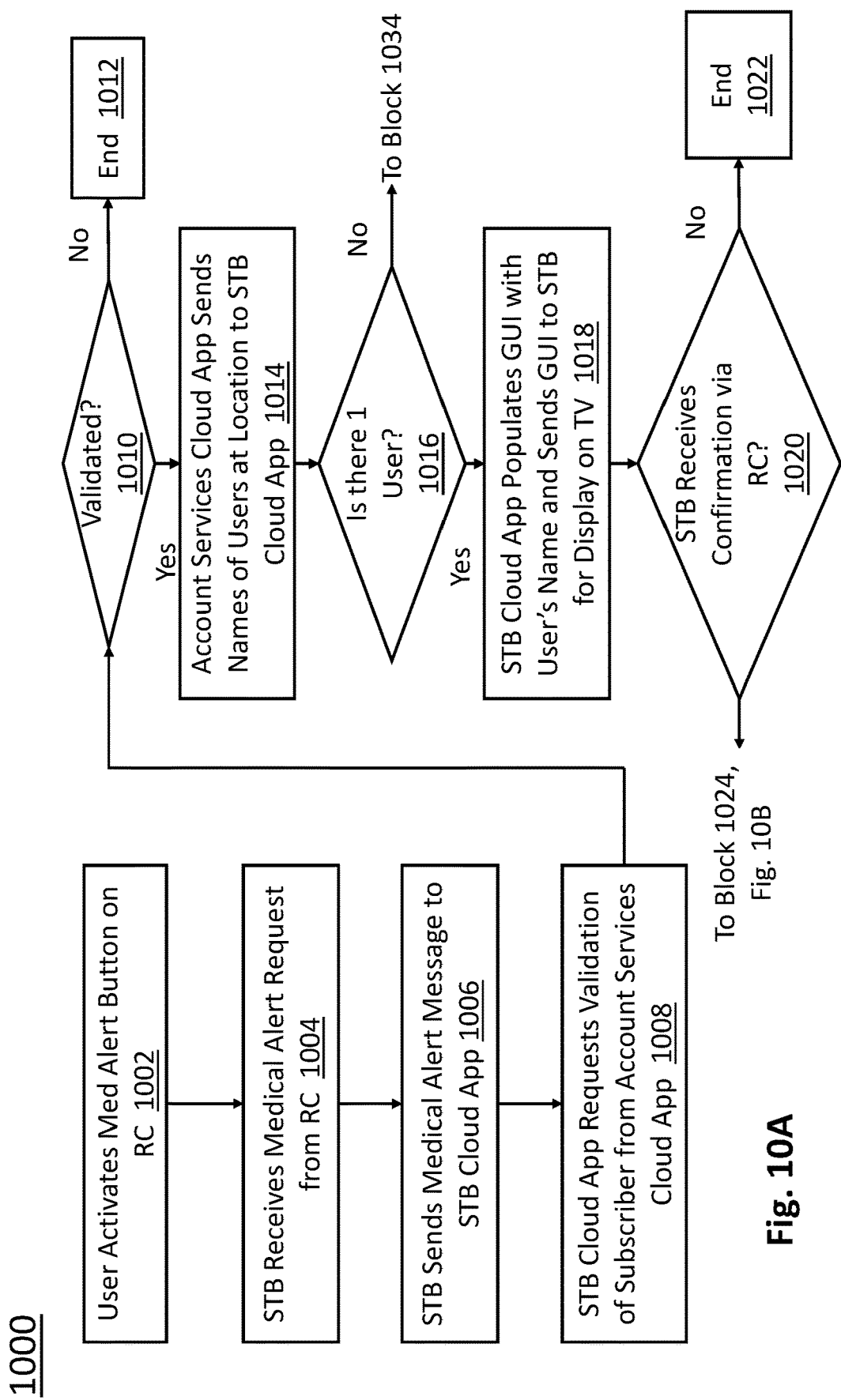
Figure 10B:
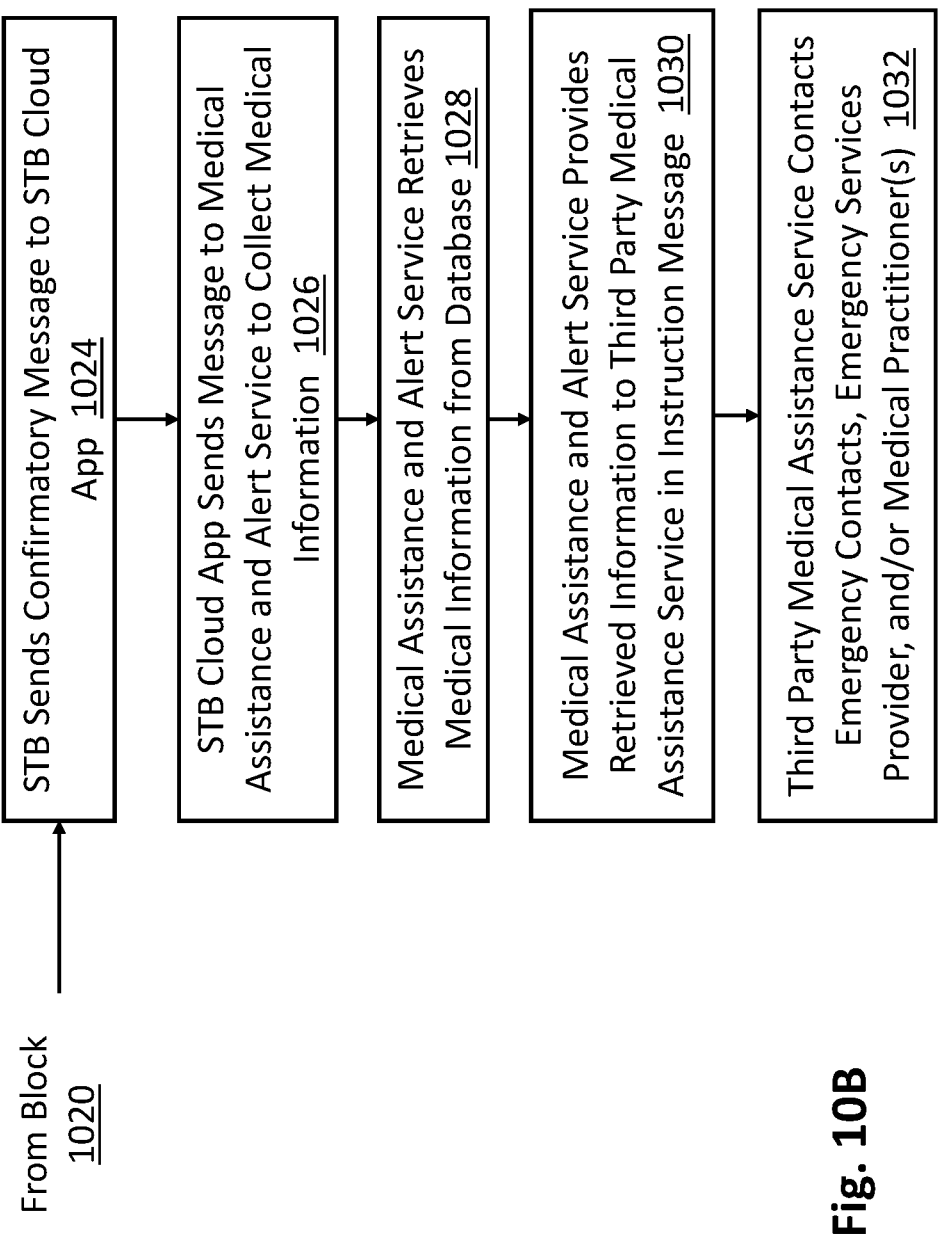

FIGS. 10A-10C show a flow chart of an example of a process 1000 performed by the system 500 of FIG. 5 to provide emergency medical services, in accordance with an embodiment of the invention. When a user watching TV has a medical emergency, such as chest pain, for example, the user activates the medical alert button or buttons on a remote control (RC) of a cable television system. For example, the user may activate the medical alert button 230 of the remote control 200 of FIG. 2 or the button combination of the remote control 300 of FIG. 3 (collectively block 512 on remote control 510 in FIG. 4), in block 1002 in FIG. 10A. When the medical alert button (or buttons) is activated on the remote control by the user, a medical alert signal or request is sent by the remote control 510 and received by a set-top box 508. The medical alert message may be in the form of a predetermined series of pulses, such as infrared pulses, for example.

The set-top box 508 receives the medical alert request, in block 1004. In one example, the set-top box converts the infrared pulses received from the remote control to a digital message, such as a predetermined series of digital pulses, and sends the digital message to the STB cloud App 514, via the distribution network 506 and the cloud 516, for example, in block 1006. The set-top box 508 may append its media control address ("MAC") to the message. The digital message sent from the set-top box 508 to the set-top box cloud App 514 may be in the form a HTTP, HTTPS, TCP, UDP, or UCP message, for example. In one example, the message may be an HTTPS message or an encrypted TCP, UDP, or UCP message, for example. All other messages between the set-top box 508 and the set-top box cloud App 514, may also be sent in an HTTP, HTTPS, TCP, UCP, or UDP message, for example, including HTTPS or encrypted TCP, UCP, or UDP messages, for example.

In this example, the STB cloud App 514 requests validation of the subscriber who sent the message in block 1008. The STB cloud App 514 may send the MAC address of the set-top box 508 to the Account services cloud App 524, for example. The Account services cloud App 524 queries an Account services database 526 with the MAC address, which is correlated with subscriber information in the database. The Account services cloud App 524 may validate the subscriber based on whether the subscriber's payment information is current, for example. If the subscriber is not validated in block 1010, in this example the process ends, in block 1012. Messages between components of the cloud 518 may be HTTP, HTTPS, TCP, UCP, or UDP messages, for example. As discussed above, since the cloud 518 is a secure environment, HTTP, TCP, UCP, or UDP messages may be used without encryption without decreasing security.

If the subscriber is validated (Yes in block 1010), then in this example, the Account services cloud App 526 retrieves the names of household members at the subscriber's home, or residents of a health care facility, for example, as well as their contact information, such as their phone number and/or address, for example, and sends them to the STB cloud App 514, in block 1014.

Based on the information received from the Account services cloud App 526, the STB cloud App determines whether there is one (1) user at the subscriber location, in block 1016. The STB cloud App 514 may do this by determining whether one (1) name or more than one (1) name is received from the Account services cloud App 526, for example.

If there is only one (1) user at the subscriber location (Yes in block 1016), then the STB cloud App 514 populates a confirmatory GUI with the subscriber's name and phone number, for example, sends the GUI to the subscriber's set-top box 508 for display on the subscriber's TV 511, via the cloud 516 and the distribution network 506, for example, in block 1018. The confirmatory GUI may be the GET MEDICAL ASSISTANCE GUI 600 of FIG. 6 or a variation thereof, for example.

The set-top box 508 determines whether a confirmation is received, via the remote control, in block 1020. The set-top box 508 may determine whether a confirmation is received based on whether a pulse sequence indicative of activation of the OK or Select button 216 on the remote control 200 (FIG. 2) is received, depending on the remote control, for example.

If the set-top box 508 does not receive a confirmation (No in block 1020), the process ends, in block 1022. The set-top box 508 may wait for a predetermined period of time before ending the process, such as a time between 1 minute and 10 minutes, for example. The process may time out in 1 minute, 5 minutes, or 10 minutes, for example.

While receipt of a confirmatory message is helpful in mitigating mistakes, such as when a user actuates a medical alert button 510 by accident, for example, it may not be determinative of whether medical assistance is to be provided. In another example, if a confirmation is not received within a predetermined period of time, it is assumed that the user's condition prevents the user from sending the confirmation. The user may be debilitated by a heart attack, for example. Therefore, if no confirmation is received within the predetermined period of time, such as within from 30 seconds to 60 seconds, for example, it is assumed that medical assistance is needed. To provide assistance in such a situation, the medical assistance and alert cloud App 528 may instruct the medical assistance service provider 532 to send an emergency services provider 538, such as an ambulance, to the user's location. In one example, the medical assistance and alert and alert cloud App 528 does not send health information to the medical assistance service provider 532, but the emergency services provider 538 may request such information from the medical assistance service provider 532, if needed, after arriving at the user's location.

If the set-top box 508 receives confirmation from the user, via the remote control, within the predetermined period of time, the process continues in block 1024 in FIG. 10B, where the STB sends a confirmatory message to STB cloud App 514.

Upon receipt of the confirmation from the set-top box 508, the STB cloud App 514 sends a message to the medical assistance and alert cloud App 528 to collect medical information related to the subscriber, in block 1026.

In response to the message received from the STB cloud App 514, the medical assistance and alert and alert cloud App 528 retrieves medical related information for the subscriber from the from the user information database 530, in block 1028. The medical assistance and alert cloud App 528 may send a medical alert instruction to provide medical assistance to the third party medical assistance service 532, via one or more networks. The subscriber's name, address, and phone number, along with the file of medical related information, may be sent in or with the medical alert instruction.

The third party medical assistance service 532 may contact emergency contacts, contact emergency services, and/or connect the user with a medical practitioner at a hospital, medical clinic, or doctors on their own staff, for example, via one or more networks 540, as discussed above, in block 1032.

Returning to block 1016 in FIG. 10B, if there is not one (1) user (No in block 1016), then there are multiple parties at the location of the subscriber, and it is necessary to identify the party requesting medical assistance. The process goes to block 1034 in FIG. 10C to make this identification. The STB cloud App 514 in this example populates the SELECT PATIENT GUI 700 in FIG. 7A for a subscriber's home or the SELECT PATIENT GUI 820 for a health care facility in FIG. 8A, respectively, or a variant thereof. It is noted that in this example, the only difference between the SELECT PATIENT GUI 700 in FIG. 7A and the SELECT PATIENT GUI 820 is the number of people displayed on the GUI.

The populated SELECT PATIENT GUI is sent to the set-top box that sent the medical alert message in block 1006, for display on the TV at the location, in block 1036. The set-top box 508 receives the SELECT PATIENT GUI and causes the SELECT PATIENT GUI to be displayed on the TV 511, in block 1036. Using the arrow keys and the OK or SELECT key, a first person needing medical assistance or a second person with the first person move a cursor displayed on the SELECT PATIENT GUI over the name of the first person and selects that name, in block 1038.

The set-top box 508 sends the selected name to the STB cloud App 514, in block 1040. The process continues to block 1018 and the process continues with the selected name of the user needing medical assistance, as described above.

As used herein, the term "set-top box" encompasses cable set-top boxes and media digital players, such as Roku, Apple TV, Google Chromecast, for example. Media digital players communicate with content providers via the Internet to obtain desired program content, as is known in the art. Digital media players are also referred to as over the top ("OTT") devices. FIG. 11 is a block diagram of a system 1100 where the set-top box is an OTT 1102, in accordance with an embodiment of the invention. A user controls the operation of the OTT 1102 via a remote control (RC) 1104, as discussed above. The OTT 1102 controls at least the program delivery and program selection of a TV 1106. The remote control 1104 includes a medical alert button 1108, along with the other buttons discussed above with respect to the remote controls 200 and 300 of FIG. 2 and FIG. 3, respectively.

In this example, the OTT 1102 is coupled to the Internet 1110 via a router 1112 and a modem 1114. Content service providers 1116 are accessed by the OTT 1102 via the router 1112, the modem 1114, and the Internet 1110. Examples of content service providers 1116 include Dish Network, Englewood, Colorado; Netflix, Inc., Los Gatos, California, and Charter Communications, Stamford, Connecticut.

The cloud 1118 is part of a content delivery system, such as the CDS 100 of FIG. 1. The CDS 100 may be a cable television system, as above. As discussed above, the CDS 100 may be a multi-service operator, such as Charter Communications, Stamford, Connecticut, for example, that provides its own program content to the OTT 1102 and/or may provide program content to the OTT 1102 from other content service providers.

The cloud 1118 corresponds to the cloud 516 of FIG. 5, for example. The cloud Apps and databases of the cloud 516 of FIG. 5 are identified collectively by the block 1120, labelled "cloud Apps," for ease of illustration. The cloud Apps 1120 operate in the same way as the components of the cloud 516 of FIG. 5, except that instead of communicating with the OTT 1102 via a distribution network 506 of the CDS, as in FIG. 5, the cloud Apps 1120 and the OTT 1104 communicate with each other via the cloud 1118 and the Internet 1110.

The medical assistance and alert service in the cloud Apps block 1120, which corresponds to the medical assistance and alert cloud App 528, communicates with the third party medical assistance service provider 1122 via a network 1124. The network 1124 may be the Internet, for example. The third party medical assistance service provider 1122 may communicate with emergency contacts and/or doctor 1126, connect user with the medical practitioners 1128 for medical advice, contact one or more emergency service providers 1130, via one or more networks 1132, such as the Internet, a cell phone network, a landline network, a satellite network, and/or an SMS network, etc., as described above with respect to FIG. 5, for example.

While a third party medical assistance service provider is described above, the functions of the medical assistance service provider may also be part of the CDS 100. The functions of the medical assistance service in FIG. 5 and FIG. 11, for example, may be performed in whole or in part by additional cloud Apps and/or one or more separate processing devices, such as computers or servers communicating with the cloud Apps via one or more networks, for example.

As discussed above, in accordance with another embodiment of the invention, a set-top box, under the control of a remote control, may send an emergency services message in addition to or instead of a medical alert message, to obtain the help of the police or a fire department for non-medical emergencies, such as a robbery or fire, for example. FIG. 12 is block diagram of an example of a system 1200 for providing emergency services in accordance with this embodiment of the invention. The system 1200 in this example includes a head end 1202 and a hub-3 1204, which communicate with a set-top box 1206 via a distribution network 1208. A remote control 1210 includes keys or buttons for causing control signals to be sent to the set-top box 1208 to control operation of a TV 1214, as is also discussed above. One of the buttons may be an emergency alert button 1212, which corresponds to the medical alert buttons described above (see the medical alert button 230 of FIG. 2). In another example, an emergency alert message may be sent by the remote control 1210 by entering a key sequence, such as 9-1-1, as discussed above with respect to FIG. 3. The remote control 1210 may include both options.

It is noted that the system 1200 may also include an OTT, such as the OTT of FIG. 11, instead of or in addition to the set-top box 1208. When an OTT is provided, a router, modem, and content service providers would be included in the system 1200, as described with respect to the system 1100 of FIG. 11. In another example, emergency services may also be obtained in the system 100 of FIG. 11 in the manner that emergency services are provided in the example of FIG. 12, for example.

A cloud 1216 is part of a content delivery system, such as the CDS 100 of FIG. 1. The CDS 100 may be a cable television system, as above. As discussed above, the CDS 100 may be a multi-service operator, such as Charter Communications, Stamford, Connecticut, for example. Messages are sent between components of the system via HTTP, HTTPS, TCP, UCP, or UBP messages, as discussed above.

The cloud 1216 corresponds to the cloud 516 of FIG. 5, for example. The cloud Apps and databases of the cloud 516 of FIG. 5 are identified collectively by the block 1218, labelled "cloud Apps," for ease of illustration. The cloud Apps 1218 operate in the same way as the components of the cloud 516 of FIG. 5 to provide medical assistance, although that is not required. If medical assistance is not to be provide by the system 1200, then the medical assistance and alert cloud App 528 and the user information database 530 of FIG. 5 need not be provided.

Figure 13:
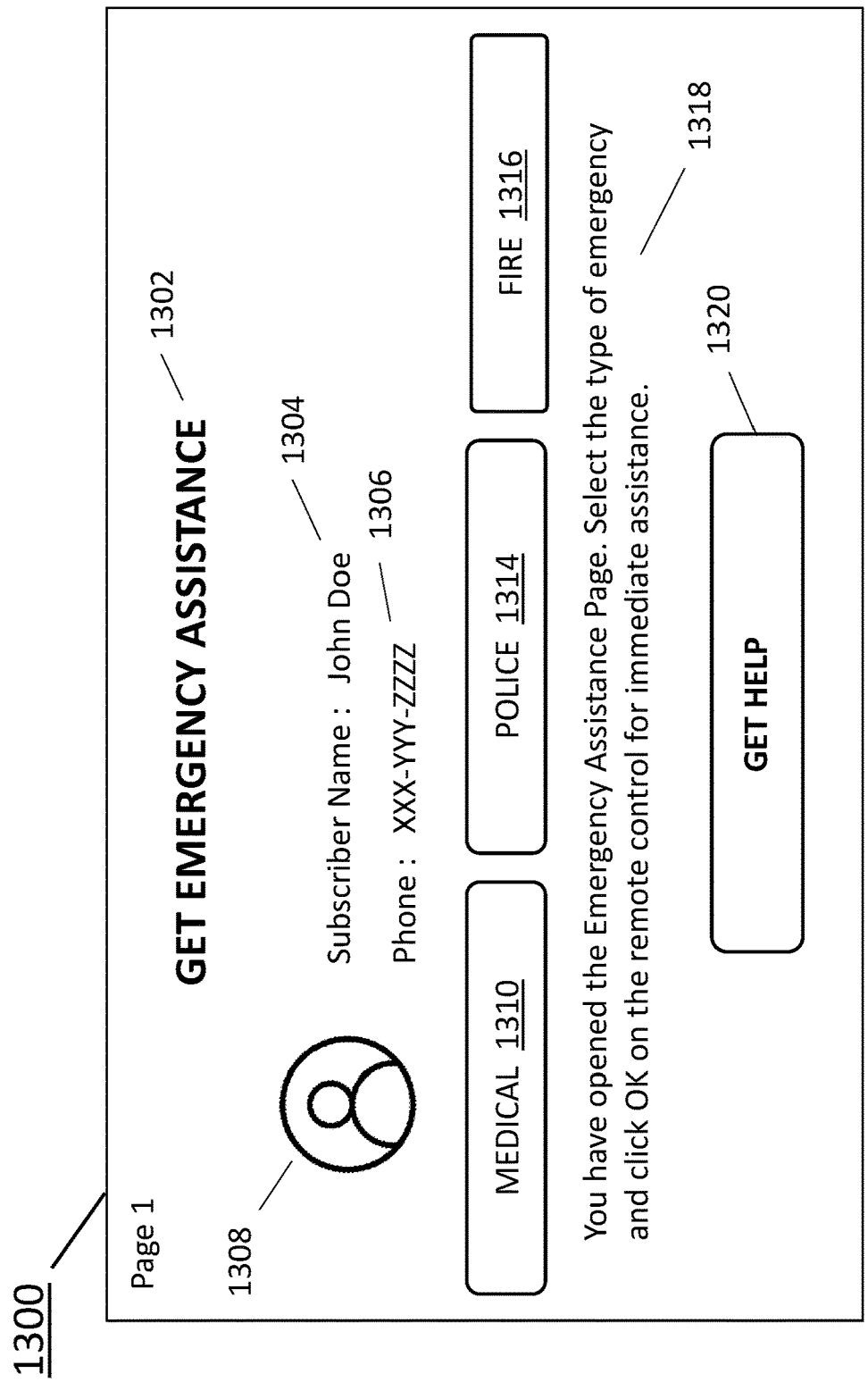
FIG. 13 and FIG. 14 are examples of graphical user interfaces that may be used by a user of the system of FIG. 12 to identify the nature of the emergency, in accordance with an embodiment of the invention.

In this example, a set-top cloud App 1218 including the functions described above with respect to the STB cloud App 514 of FIG. 5 is further configured to handle emergency messages by sending an appropriate GUI when an emergency message is received. FIG. 13 is an example of a GUI 1300 that may be generated and populated by the STB cloud App 1218 or the set-top box 1208 of FIG. 12 for use by the someone in a home, for example. The GUI 1300 in this example includes a title 1302 "GET EMERGENCY ASSISTANCE," to identify the GUI for the user. In contrast to the GUIs of discussed above, where it is advantageous to identify the person who needs medical assistance, it is not necessary to identify the person requesting the assistance of the police or fire departments. A name field 1304 is therefore populated with the subscriber's name. Another field 1306 is populated with the subscriber's phone number. The GUI 1300 may also include a picture 1308 of the subscriber.

The GUI 1300 in this example includes three icons 1310, 1312, 1314, respectively, for requesting MEDICAL assistance (1310), POLICE assistance (1312), and FIRE assistance (1314). In operation, the party needing emergency assistance may advance a cursor or arrow over the MEDICAL 1310, POLICE 1312, or FIRE 1314 icons to select the type of assistance needed. The respective icon 1310, 1312, 1314 may be selected using the Select button 216 on the remote control 200 in FIG. 2, for example. When the arrow is placed over each icon 1310, 1312, 1314, the icon may be highlighted.

Below the icons 1310, 1312, 1314 may be instructions 1316 that may include the text "You have opened the Emergency Assistance Page. Select the type of emergency and click OK on the Remote Control for immediate assistance," for example. A GET HELP banner 1318 may also be provided, as in the GUI 600 of FIG. 6. The GUI 1300 may have a different configuration.

If it is determined by the STB cloud App 1218 (or the STB App 918 of FIG. 9) that the MEDICAL icon 1310 has been selected, and there is more than one person at the subscriber location, then it is necessary to determine the user who is requesting medical assistance. The STB cloud App 1218 or the STB App 918 populates the applicable GUI 700 shown in FIG. 7A or the GUI 800 of FIG. 8A, for example, and causes it to be displayed on the TV 1214 coupled to the set-top box 1208. After selection of the person needing medical assistance, a confirmatory GUI is populated by the set-top box 1208, such as the GUI 720 of FIG. 7B and the GUI 840 of FIG. 8B, and displayed, as discussed above.

Figure 14:
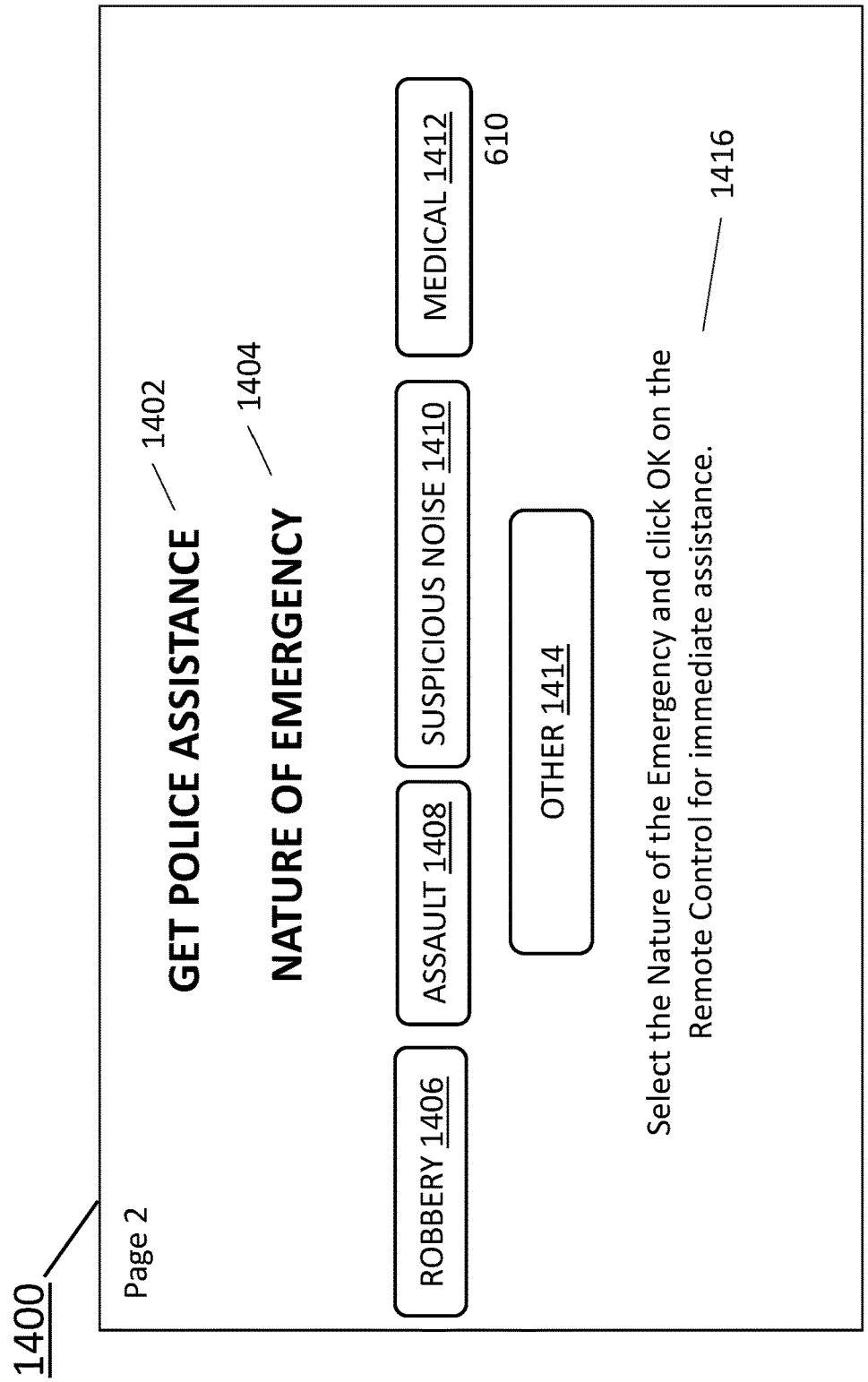

If the POLICE icon 1312 is selected, then another GUI may be populated to identify the reason for requesting police assistance. FIG. 14 is an example of such a GUI 1400, which may have the title 1402 "GET POLICE ASSISTANCE." Below the title 1402 in this example is the statement 1404 "NATURE OF EMERGENCY." Four icons 1406, 1408. 1410, 1412 labeled ROBBERY, ASSAULT, SUSPICIOUS NOISE, and MEDICAL, respectively, are provided for selection by the user with a cursor, under the control of the remote control 1210 of FIG. 12. If none of the listed problems are appropriate, another icon 1414 for OTHER problems may be provided. In that case, another GUI listing additional problems may be displayed. OTHER problems may include home invasion and domestic abuse, for example. In another example, a support team or call center may call the subscriber location or send a message, such as an SMS message, for example, requesting additional information, as discussed below.

Exemplary text 1416 with instructions to the user may be provided below the icons 1406 1408, 1410, 1412, 1414. In this example, the instructions are: "Select the nature of the emergency and click OK on the remote control for immediate assistance." As above, if the remote control does not include an OK key but instead includes a Select key, the text 1414 may read "Select the nature of the emergency and PRESS SELECT on the remote control for immediate assistance." Other instructions may be included instead of or in addition to the exemplary instructions shown in FIG. 6. A banner 612 below the instructions reading: "Get Help." The banner 612 may be in red or another bright color to attract attention.

Returning to FIG. 13, if the user selects the FIRE icon 1314, it is not necessary to obtain further information. An additional GUI is not, therefore, provided to the user in this example.

Returning to FIG. 12, when the STB cloud App 1218 (or the STB App 918) determines that the user is requesting the assistance of the police or fire department, and the reason for requesting the police, based on the selections made on the GUI 1300 and the GUI 1400, if applicable, the STB cloud App 1218 (or the STB App 918) in this example obtains identifying information of the subscriber associated with the set-top box sending the emergency request, here the set-top box 1208. Subscriber information may be obtained from an account services cloud App, as discussed above with respect to the account services cloud App 524 in FIG. 5. An account services cloud App is included among the cloud Apps 1220 shown in FIG. 12. The subscriber information in this example may include the subscriber's name, address, and phone number, for example. The account services cloud App may perform validation of the subscriber at the location of the set-top box 1206, as discussed above with respect to FIG. 5. While a STB cloud App 1218 is referred to in the discussion of FIG. 12, it should be understood that the functions of the STB cloud App may also be performed by a STB App running on the set-top box 1206, as discussed above with respect to FIG. 9, for example.

After receiving the subscriber information, the STB cloud App 1218 generates an emergency request message and sends it to a support team 1222 via a network 1224. The network 1224 may be the Internet, for example. The emergency request message includes identifying information of the user (obtained from the account services cloud App 524, whether the request is for assistance by the police or the fire department, and if the request is for police assistance, the nature of the problem.

The support team 1222 includes human operators in this example. An operator receives the emergency request message and determines whether the received information is complete. Complete information includes the subscriber's name, address, home phone number, a request for emergency services from the police or fire department, and if the request is for emergency services for the police, the nature of the emergency. If any information is missing, the operator may contact the subscriber via the subscriber's home phone number to obtain the missing information. An operator in the support team may also call subscribers 1222 if the icon for OTHER 1414 in the GUI 1400 of FIG. 14 is selected, to obtain additional information about why police assistance is being requested. In another example, if multiple emergency alerts are being sent from a location, there could be an emergency or a mistake. An operator may then call the subscriber for clarification. The operators in the support team 1222 may call subscribers 1226 via a network 1228. The network 1228 may be a POTS or a VoIP network, for example. The operator may also attempt to contact the subscriber by an SMS or other such message if the subscriber cannot be reached via a phone call. Some or all of the functions of the support team 1222 may also be performed by a suitably programmed processing device or application-specific integrated circuit (ASIC), for example.

The operator sends the emergency request message to an appropriate public safety answering point ("PSAP") 1230, which then contacts an emergency service provider, such as the police department 1232 or fire department 1234 assigned to the geographic location of the subscriber 1226. As is known in the art, 9-1-1 calls made from a landline are directed to the appropriate PSAP 1230 automatically. In this embodiment, the operator in the support team 1222 determines the appropriate PSAP to handle the emergency request message by the zip code, Federal Information Processing Standard Publication ("FIPS") code, and phone number of the subscriber. The operator can then direct the emergency request message to a 9-1-1 service dedicated to a police or fire department that covers the area within which the subscriber lives. The zip code and FIP code may be retrieved from and/or be based on the subscriber's address or phone number, for example, and correlated with an appropriate 9-1-1 service from a table in a database 1223, for example. The database 1223 may also correlate addresses with respective appropriate 9-1-1 services in case the zip code is not included with the subscriber's address, and/or if the zip code and the FIP code does not identify a unique 9-1-1 service, for example. The database 1223 may be or include the National Emergency Number Association (NENA) North American 9-1-1 Resource Database, which includes the National Public Safety Answering Point ("PSAP") Registry.

Figure 15:
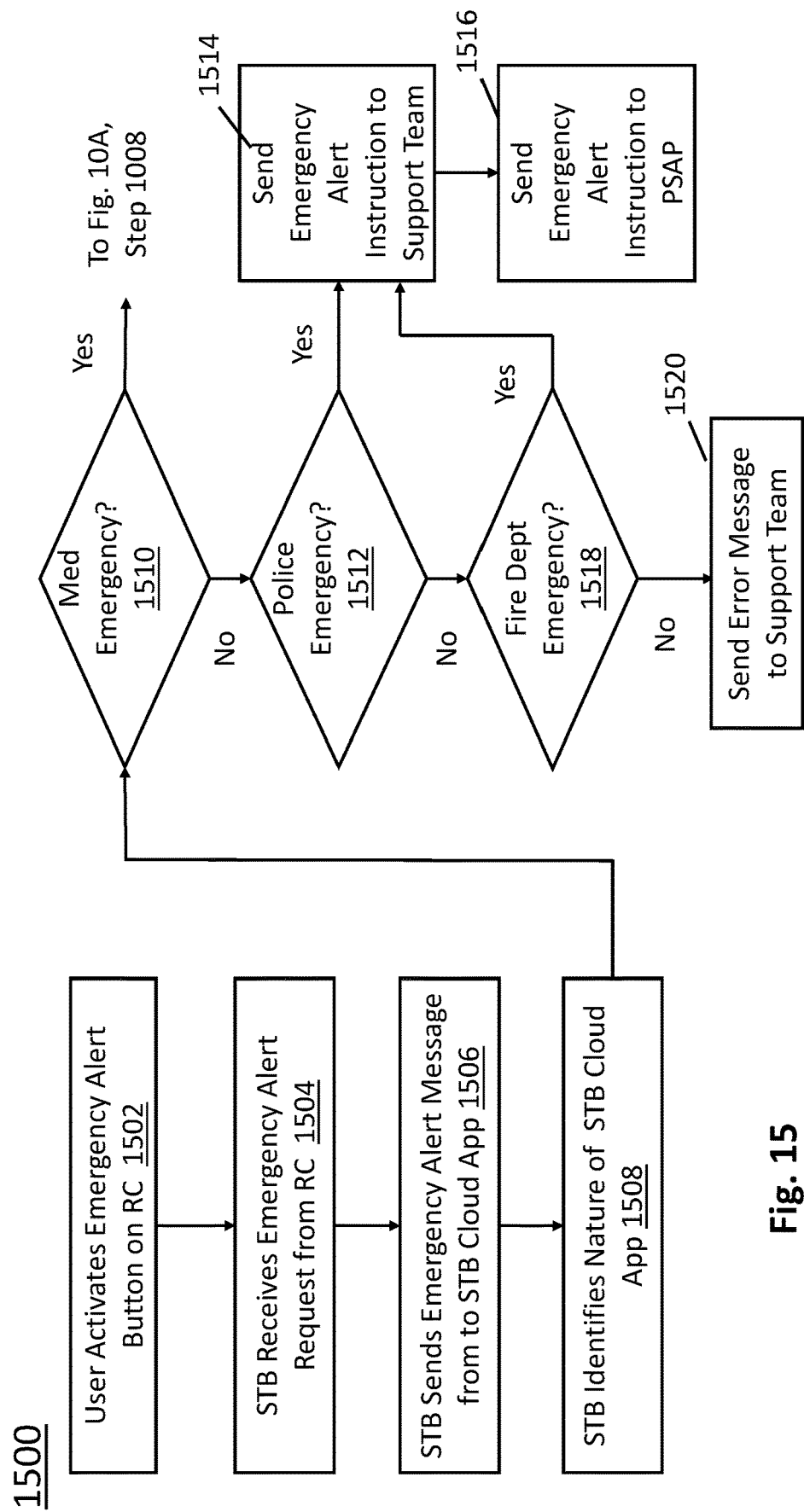
FIG. 15 is a flowchart of an example of a process of providing emergency assistance by the system of FIG. 12, in accordance with an embodiment of the invention.

FIG. 15 is a flowchart 1500 of an example of a process for handling emergency alert requests, which may be a request for medical emergency assistance, a request for police emergency assistance, or a request for fire department assistance, in accordance with another embodiment of the invention. Referring to the system 122 of FIG. 12, and similar to the process 1000 of FIG. 10A, a user activates an emergency alert button (or sequence of buttons) 1212 on their remote control 1210, in block 1502 to send an emergency alert request to the set-top box 1208. The set-top box 1208 receives the emergency alert request from the remote control 1210, in block 1504, and the set-top box sends an emergency alert message to the STB cloud App 1218, in block 1506. While a STB cloud App 1218 is referred to in the discussion of the flowchart 15, it should be understood that the functions of the STB cloud App may also be performed by a STB App running on the set-top box 1206, as discussed above with respect to FIG. 9, for example.

The STB cloud App 1218 identifies the nature of the emergency, in block 1508, by analyzing data entered on one or more GUIs displayed by the set-top box 1210, such as the GUI 1300 and the GUI 1400 of FIG. 13 and FIG. 14, respectively, which are displayed on a display device 1214 associated with the set-top box at the subscriber location. As discussed above, the person sending the emergency alert can make selections on the GUI 1300, 1400, via the remote control 1210, for example.

If the STB cloud App 1218 identifies that the nature of the emergency is a medical emergency (Yes in block 1510), the process may continue to block 1008 of FIG. 10A, for example, for validation. The process would then continue as described above for a medical emergency.

If the STB cloud App 1218 identifies that the nature of the emergency is not a medical emergency (No in block 1510), the process continues in this example to block 1512. If the emergency is a police emergency (Yes in block 1512), then an emergency request is sent to the support team 1222, in block 1514. Validation may be performed here, as well, as described above. An operator reviews the information provided with the emergency request for completeness, contacts the user making the emergency request, if necessary, determines a zip code or area code of the location where the emergency requests is being made, for example, and then sends the emergency alert instruction to an appropriate PSAP, in block 1516. The PSAP contacts the police department local to the subscriber location, as discussed above with respect to FIG. 12.

If the emergency request is not a request for the police (No in block 1512) department, then it is determined whether the emergency request is a request for the fire department, in block 1518. Validation may also be performed here, as discussed above.

If the emergency request is for the fire department (Yes in block 1518), the emergency request is sent to the support team 1222, in block 1514. An emergency request instruction is sent by the support team 1222 to the PSAP, in block 1516, which contacts the fire department local to the subscriber location, as discussed above with respect to FIG. 12.

If the emergency request is not a request for the fire department (No in block 1518), then there has been an error. In one example, the STB cloud App 1218 may send an error message to the support team, in block 1520. An operator in the support team 1222 may then attempt to contact someone at the subscriber location based on the contact information provided with the emergency alert message, for example.

Figure 16:
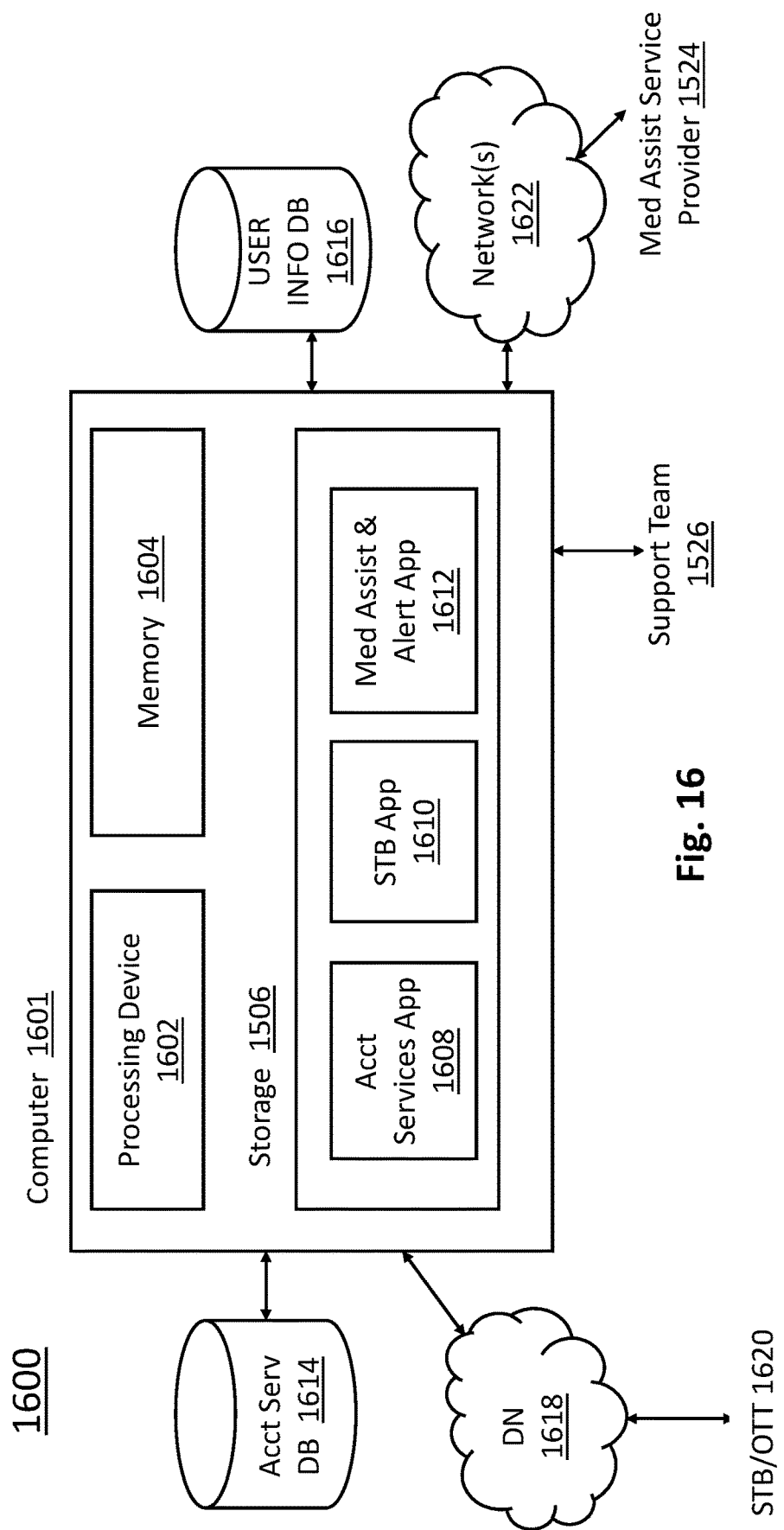
FIG. 16 is an example of a hardware platform for receiving emergency services messages and conveying instructions to a suitable provider, in accordance with an embodiment of the invention.

Any or all of the cloud Apps in the examples of FIG. 5, FIG. 11, and FIG. 12 may be performed by one or more non-virtual processing devices, such as one or more computers or servers, for example. FIG. 16 is an example of a hardware platform 1600 for receiving an emergency alert messages from set-top boxes and conveying emergency alert instructions to appropriate parties. The hardware platform 1600 includes a computer 1601 including a processing device 1602, such as a central processing unit, microprocessor, or microcontroller, for example. Memory 1504, such as RAM or DRAM, and storage 1606, such as one or more hard drives and/or SSDs, are also provided. Software Apps or modules for controlling operation of the processing device 1602 may be stored in the storage 1606, including an account services App 1608, an STB App 1610, and a medical assistance and alert App 1612, for example. The account services App 1608, the STB App 1610, and the medical assistance and alert App 1612 operate in the same manner as discussed above with respect to the account services cloud App 524, the STB cloud App 514, and the medical assistance and alert cloud App 528, except that they each cause the processing device 1502 to perform the described functions instead of causing one or more virtual processors to perform the described functions. If the message received from the set-top box/OTT 1620 is determined by the STB App 1610 to be an emergency services message, then in this example a message is sent to a support team 1626, as discussed above with respect to the STB App 1214 of FIG. 12, for example.

An account services database 1614 and a user information database 1616 are also provided for access by the processing device 1602, under control of the account services App 1608 and the medical assistance and alert App 1612, respectively, as is also described above. The account services database 1614 and a user information database 1616 may be database servers, for example.

A distribution network (DN) 1618 for secure communication between the computer 1601 and the set-top box (STB) or over the top (OTT) device, collectively 1620, is also shown, as discussed above. Network(s) 1622 is also shown for communication between the computer 1601 and a third party medical assistance service provider 1624, in this example, as is also discussed above.

The computer 1601 may also be configured in whole or in part to implement aspects of embodiments of the invention by hardware, such as an application-specific integrated circuit (ASIC), or by a combination of hardware and software.

Examples of implementations of embodiments of the invention are described above. Modifications may be made to those examples without departing from the scope of the invention, which is defined by the claims, below.

What is claimed is:

1. A method of sending a medical alert, comprising:
receiving a medical alert request from a user by a set-top box at a subscriber location, the medical alert request being received from a television remote control associated with the set-top box, after actuation of the remote control by the user;
sending a medical alert message by the set-top box based on the received medical alert request, to a processing device, via a first network;
if it is determined that there is only one resident at the subscriber location, displaying a graphical user interface on a display device, by the set-top box, the graphical user interface being populated with a name of a subscriber at the subscriber location, the graphical user interface enabling confirmation by the user that medical assistance is needed, via the remote control;
receiving a confirmation message by the set-top box, from the user, that medical assistance is needed, via the remote control;
if confirmation is received via the remote control, from the user, sending a confirmation message to the processing device, by the set-top box;
wherein the processing device sends a medical alert instruction to provide medical assistance to the subscriber location to a medical assistance service provider, via a second network, based, at least in part, on the message, if the confirmation message is received by the processing device.

2. The method of claim 1, wherein the graphical user interface is populated by the set-top box or by the processing device.

3. The method of claim 1, further comprising:
if it is determined that there is more than one resident at the subscriber location, displaying a graphical user interface on a display device, by the set-top box, the graphical user interface being populated with a name of each resident at the subscriber location;
receiving a selection of a name on the first graphical user interface, by the set-top box, via the remote control; and
sending the selected name to the processing device, by the set-top box, via the network.

4. The method of claim 3, wherein the graphical user interface is populated by the set-top box or by the processing device.

5. The method of claim 3, further comprising:
displaying a second graphical user interface populated with the selected name, the second graphical user interface enabling confirmation that medical assistance is needed, via the remote control;
if confirmation is received by the set-top box, via the remote control, sending a confirmation message to the processing device, by the set-top box, via the first network;
wherein, if the confirmation message is received by the processing device, the processing device sends the medical alert instruction to the medical assistance service provider.

6. The method of claim 1, wherein, if the user is a registered user, the method further comprises:
collecting medical related information related to the user, from a database; and
sending the medical related information with the medical alert instruction to the medical assistance service provider.

7. The method of claim 1, wherein if the user is not a registered user, providing the user's name and address to the medical service provider with the medical alert instruction.

8. The method of claim 1, wherein the set-top box and the processing device are part of a content distribution system.

9. The method of claim 8, wherein the content distribution system is a cable television system.

10. The method of claim 1, wherein the medical assistance service provider is a third party.

11. The method of claim 1, wherein the first network includes an optical network, a hybrid fiber coax ("HFC") network for cable, an IP network, a Plain Old Telephone System (POTS) for ADSL, a terrestrial broadcast system, and/or a satellite distribution system.

12. The method of claim 1, wherein the first network and the second network are different.

13. A method of sending a medical alert, comprising:
receiving a medical alert request from a user by a set-top box at a subscriber location, the medical alert request being received from a remote control associated with the set-top box, after actuation of the remote control by the user; and
sending a medical alert message by the set-top box based on the received medical alert request, to a processing device, via a first, cable television network;
wherein:
the processing device sends a medical alert instruction to provide medical assistance to the subscriber location to a medical assistance service provider, via a second network, based, at least in part, on the message; and
if the user is a registered user, the processing device:
collects medical related information related to the user, from a database; and
sends the medical related information with the medical alert instruction to the medical assistance service provider.

14. The method of claim 13, wherein, if the user is not a registered user, the processing device provides the user's name and address to the medical service provider with the medical alert instruction.

15. The method of claim 13, wherein the medical assistance service provider is a third party.

16. The method of claim 13, wherein the graphical user interface is populated by the set-top box or by the processing device.

17. The method of claim 13, wherein the first, cable television network and the second network are different networks.

18. A method of sending a medical alert, comprising:
receiving a medical alert request from a user by a set-top box at a subscriber location, the medical alert request being received from a remote control associated with the set-top box, after actuation of the remote control by the user;
displaying a graphical user interface by the set-top box, the graphical user interface enabling confirmation, by the user, that medical assistance is needed by the user, via the remote control;
receiving a confirmation message by the set-top box, from the user, that medical assistance is needed, via the remote control; and if confirmation is received, sending a confirmation message to the processing device, by the set-top box;

wherein, if the confirmation message is received by the processing device, the processing device sends the medical alert instruction to the medical assistance provider.

19. The method of claim 18, wherein, if it is determined that there is only one resident at the subscriber location, the method comprises:

displaying the graphical user interface populated with a name of a subscriber at the subscriber location.

20. The method of claim 18, wherein, if it is determined that there is more than one resident at the subscriber location, the method comprises:

displaying the graphical user interface populated with a name of each resident at the subscriber location;

receiving a selection of a name on the first graphical user interface, by the set-top box, via the remote control; and sending the selected name to the processing device, by the set-top box.

21. The method of claim 18, wherein the set-top box and the processing device are part of a cable television system.

22. The method of claim 18, wherein the medical assistance service provider is a third party.

23. The method of claim 18, wherein the graphical user interface is populated by the set-top box or by the processing device.

* * * * *